US012518709B2

(12) United States Patent
Kim et al.

(10) Patent No.: US 12,518,709 B2
(45) Date of Patent: Jan. 6, 2026

(54) DISPLAY DEVICE

(71) Applicant: LG Display Co., Ltd., Seoul (KR)

(72) Inventors: Hyunchul Kim, Paju-si (KR); Sanghwa Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/978,407

(22) Filed: Dec. 12, 2024

(65) Prior Publication Data

US 2025/0279074 A1 Sep. 4, 2025

(30) Foreign Application Priority Data

Feb. 29, 2024 (KR) ........................ 10-2024-0029522

(51) Int. Cl.
*G09G 3/3291* (2016.01)
*G09G 3/3233* (2016.01)

(52) U.S. Cl.
CPC ......... *G09G 3/3291* (2013.01); *G09G 3/3233* (2013.01); *G09G 2300/0842* (2013.01); *G09G 2310/0291* (2013.01); *G09G 2310/08* (2013.01)

(58) Field of Classification Search
CPC ... G09G 3/3291; G09G 3/3283; G09G 3/3275
See application file for complete search history.

(56) References Cited

FOREIGN PATENT DOCUMENTS

KR 20220078234 A 6/2022

*Primary Examiner* — Sardis F Azongha
(74) *Attorney, Agent, or Firm* — Seed Intellectual Property Law Group LLP

(57) ABSTRACT

The present disclosure relates to a display device, and to display device in which output parts of a data driver may be used commonly. According to the present disclosure, a display device may comprise a display panel including a plurality of pads, and a data driver including a plurality of pads, wherein the data driver includes a first output part including a buffer, a holder, and a first input or output pad, and a first data switch is disposed between the buffer and the first input/output pad. According to the present disclosure, it is possible to reduce the cost commonly using the data driver of the display device.

20 Claims, 18 Drawing Sheets

DISPLAY DEVICE

CROSS-REFERENCE TO RELATED APPLICATION

The present application claims priority to Korean Patent Application No. 10-2024-0029522, filed Feb. 29, 2024, the entire contents of which is incorporated herein for all purposes by this reference.

BACKGROUND

Technical Field

The present disclosure relates to a display device.

Description of the Related Art

Recently, as the information age enters, a display field in which electrical information signals are visually expressed has developed rapidly, and in response thereto, various display devices having excellent performance, such as thinness, lightness, and low power consumption, are being developed.

Specific examples of display devices may include a liquid crystal display (LCD) device, an organic light emitting diode (OLED) display device, a quantum dot display device, etc.

Such a display device uses a timing controller, a data driver, a display panel, etc., for an operation thereof.

BRIEF SUMMARY

The present disclosure is directed to a display device in which output parts of a data driver may be commonly used The present disclosure is directed to providing a display device in which the cost can be reduced by commonly using a data driver of a display device.

A display device according to one embodiment includes a display panel including a plurality of pads, and a data driver including a plurality of pads, wherein the data driver includes a third output part including a buffer, a holder, and a first input/output pad, and a first data switch is disposed between the buffer and the first input/output pad.

The third output part may further include a first sensing switch, a first voltage switch, and a second voltage switch.

The first data switch may have one end connected to the buffer and the other end connected to the first input/output pad, the first sensing switch may have one end connected to the holder and the other end connected to the first input/output pad, the first voltage switch may have one end connected to a first initialization voltage and the other end connected to the first input/output pad, and the second voltage switch may have one end connected to a second initialization voltage and the other end connected to the first input/output pad.

The data driver may further include a first output part including a buffer and a data pad, a second output part including a holder and a sensing pad, and a fourth output part including a buffer, a holder, a second input/output pad, and a third input/output pad.

The first output part may further include a first data switch, and the first data switch may have one end connected to the buffer and the other end connected to the data pad.

The second output part may further include a first sensing switch, a first voltage switch, and a second voltage switch, the first sensing switch may have one end connected to the holder and the other end connected to the sensing pad, the first voltage switch may have one end connected to a first initialization voltage and the other end connected to the sensing pad, and the second voltage switch may have one end connected to a second initialization voltage and the other end connected to the sensing pad.

The fourth output part may further include a first data switch, a second data switch, a first sensing switch, a second sensing switch, a first voltage switch, a second voltage switch, a third voltage switch, and a fourth voltage switch, the first data switch may have one end connected to the buffer and the other end connected to the second input/output pad, the second data switch may have one end connected to the buffer and the other end connected to the third input/output pad, the first sensing switch may have one end connected to the holder and the other end connected to the second input/output pad, the second sensing switch may have one end connected to the holder and the other end connected to the third input/output pad, the first voltage switch may have one end connected to a first initialization voltage and the other end connected to the second input/output pad, the second voltage switch may have one end connected to the first initialization voltage and the other end connected to the third input/output pad, the third voltage switch may have one end connected to a second initialization voltage and the other end connected to the second input/output pad, and the fourth voltage switch may have one end connected to the second initialization voltage and the other end connected to the third input/output pad.

A display device according to one embodiment includes a display panel including a plurality of pads, and a data driver including a plurality of pads, wherein the data driver may include a fourth output part including a buffer, a holder, a second input/output pad, and a third input/output pad, a first data switch may be disposed between the buffer and the second input/output pad, a first sensing switch may be disposed between the holder and the second input/output pad, a second data switch may be disposed between the buffer and the third input/output pad, and a second sensing switch may be disposed between the holder and the third input/output pad.

The fourth output part may further include a first voltage switch, a second voltage switch, a third voltage switch, and a fourth voltage switch.

The first data switch may have one end connected to the buffer and the other end connected to the second input/output pad, the second data switch may have one end connected to the buffer and the other end connected to the third input/output pad, the first sensing switch may have one end connected to the holder and the other end connected to the second input/output pad, the second sensing switch may have one end connected to the holder and the other end connected to the third input/output pad, the first voltage switch may have one end connected to a first initialization voltage and the other end connected to the second input/output pad, the second voltage switch may have one end connected to the first initialization voltage and the other end connected to the third input/output pad, the third voltage switch may have one end connected to a second initialization voltage and the other end connected to the second input/output pad, and the fourth voltage switch may have one end connected to the second initialization voltage and the other end connected to the third input/output pad.

The data driver may include a first output part including a buffer and a data pad, a second output part including a holder and a sensing pad, and a third output part including a buffer, a holder, and a first input/output pad.

The first output part may further include a first data switch, and the first data switch may have one end connected to the buffer and the other end connected to the data pad.

The second output part may further include a first sensing switch, a first voltage switch, and a second voltage switch, the first sensing switch may have one end connected to the holder and the other end connected to the sensing pad, the first voltage switch may have one end connected to a first initialization voltage and the other end connected to the sensing pad, and the second voltage switch may have one end connected to a second initialization voltage and the other end connected to the sensing pad.

The third output part may further include a first sensing switch, a first voltage switch, and a second voltage switch, the first data switch may have one end connected to the buffer and the other end connected to the first input/output pad, the first sensing switch may have one end connected to the holder and the other end connected to the first input/output pad, the first voltage switch may have one end connected to a first initialization voltage and the other end connected to the first input/output pad, and the second voltage switch may have one end connected to a second initialization voltage and the other end connected to the first input/output pad.

DETAILED DESCRIPTION

Figure 1:
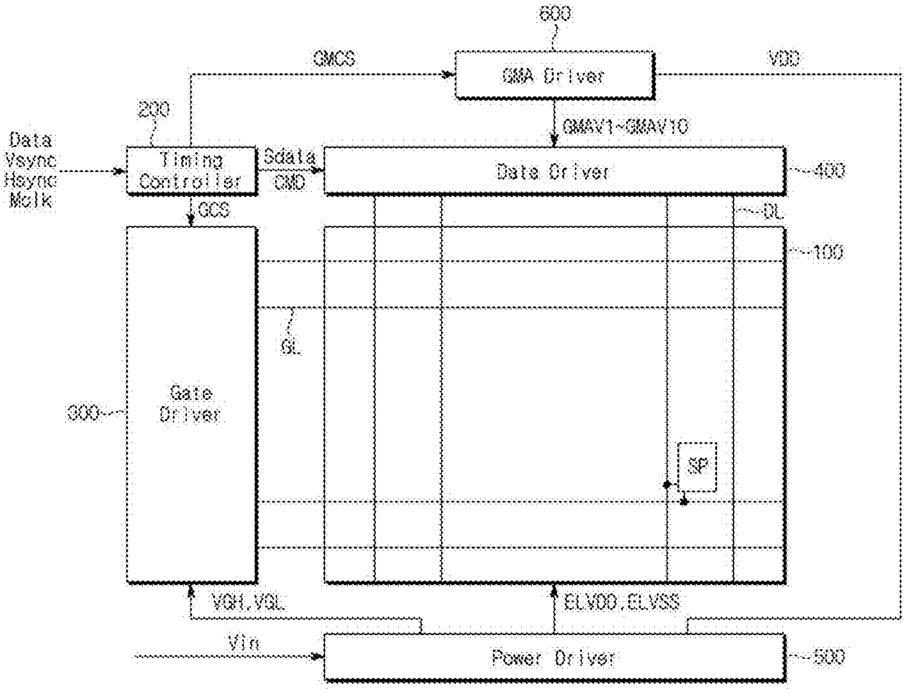
FIG. 1 is a block diagram showing a display device according to embodiments of the present disclosure.

Advantages and features of the present disclosure and methods for achieving them will become clear with reference to embodiments described below in detail in conjunction with the accompanying drawings. The present disclosure is not limited to the embodiments disclosed below but can be implemented in various different forms, these embodiments are merely provided to make the disclosure of the present disclosure complete and fully inform those skilled in the art to which the present disclosure pertains of the scope of the present disclosure.

Since shapes, sizes, ratios, angles, numbers, and the like disclosed in the drawings for describing the embodiments of the present disclosure are illustrative, the present disclosure is not limited to the shown items. The same reference number indicates the same components throughout the specification. In addition, in describing the present disclosure, when it is determined that the detailed description of a related known technology may unnecessarily obscure the gist of the present disclosure, detailed description thereof will be omitted.

When the terms "comprise," "include," "have," and "consist of" described in the present specification are used, other parts may be added unless "only" is used. When a component is expressed in the singular, it can be construed as a plurality of components unless specifically stated otherwise.

In construing a component, the component is construed as including the margin of error even when there is no separate explicit description.

When the positional relationship is described, for example, when the positional relationship between two components is described using the term "on," "above," "under," "next to," or the like, one or more other components may be positioned between the components unless the term "immediately" or "directly" is used.

Although the term "first," "second," or the like may be used to distinguish components, functions or structures of the components are not limited by the ordinal number or component name added to the front of the component.

The following embodiments may be partially or fully coupled or combined, and various technological interworking and driving are possible. The embodiments may be implemented independently of each other and implemented together in the associated relationship.

A driving circuit of a display device may write pixel data of input images into pixels. A driving circuit of a flat panel display device may include a data driver for supplying data signals to data lines, and a gate driver for supplying gate signals to gate lines.

In the display device according to the present disclosure, each of a pixel circuit and a gate driver may include a plurality of transistors and may be formed directly on a substrate of a display panel. The transistor may be implemented as a thin film transistor (TFT) having a metal-oxide-semiconductor field effect transistor (MOSFET) structure and may be an oxide TFT containing an oxide semiconductor or a low temperature polysilicon (LTPS) TFT containing LTPS.

A transistor is a three-electrode element including a gate, a source, and a drain. The source is an electrode for supplying carriers to the transistor. The carriers start to flow from the source in the transistor. The drain is an electrode through which the carriers moves from the transistor to the outside. In the transistor, flows of the carriers flow from the source to the drain. In the case of an n-channel transistor, since the carriers are electrons, a source voltage has a lower voltage than a drain voltage so that the electrons may flow from the source to the drain. In the n-channel transistor, a direction of the current flows from the drain to the source. In the case of a p-channel transistor, since the carriers are holes, the source voltage is higher than the drain voltage so that the holes may flow from the source to the drain. In the p-channel transistor, a current flows from the source to the drain because the holes flow from the source to the drain. It should be noted that the source and drain of the transistor are not fixed. For example, the source and the drain may be changed depending on an applied voltage. Therefore, the disclosure is not limited by the source and drain of the transistor. In the following description, the source and drain of the transistor are referred to as "first and second electrodes."

A gate signal may swing between a gate-on voltage and a gate-off voltage. The gate-on voltage is set to a voltage higher than a threshold voltage of the transistor. The gate-off voltage is set to a voltage lower than the threshold voltage of the transistor.

While the transistor is turned on in response to the gate-on voltage, the transistor is turned off in response to the gate-off voltage. In the case of the n-channel transistor, the gate-on voltage may be a gate high voltage VGH or VEH, and the gate-off voltage may be a gate low voltage VGL or VEL. In the case of the p-channel transistor, the gate-on voltage may be the gate low voltage VGL or VEL, and the gate-off voltage may be the gate high voltage VGH or VEH. In the following embodiments, although an example in which transistors of a pixel circuit are implemented as p-channel transistors will be mainly described, it should be noted that the present disclosure is not limited thereto.

Hereinafter, various embodiments of the present disclosure will be described in detail with reference to the accompanying drawings. In the following embodiments, although an example in which the display device is an OLED display device, the present disclosure is not limited thereto.

FIG. 1 is a block diagram showing a display device according to embodiments of the present disclosure.

Referring to FIG. 1, a display device according to embodiments of the present disclosure may include a display panel 100, a timing controller 200, a gate driver 300, a data driver 400, a power driver 500, and a gamma driver 600.

The display panel 100 includes a pixel array in which input images are displayed on a screen. The pixel array includes a plurality of data lines DL, a plurality of gate lines GL intersecting the data lines DL, and sub-pixels SP disposed in a matrix form.

The display panel 100 may be implemented as a non-transmissive display panel or a transmissive display panel. The display panel 100 may be manufactured as a flexible display panel. The flexible display panel may be implemented as an OLED panel using a plastic substrate.

The timing controller 200 may receive digital video data Data of input images and timing signals Vsync, Hsync, and Clk synchronized therewith from a set system. The digital video data is a differential data signal and may be serial data. The timing signals may include the vertical synchronization signal Vsync, the horizontal synchronization signal Hsync, and the clock Clk. The set system may include a TV, a monitor, a set-top box, a navigation system, a personal computer, a home theater system, a mobile device, a wearable device, a vehicle system, etc.

The timing controller 200 may control an operation timing of the display panel 100 according to an input frequency. The input frequency may be 60 Hz in a national television standards committee (NTSC) format. Recently, display devices driven at a higher frequency of 120 Hz have become popular. In addition, the display device driven at 120 Hz may be controlled to be temporarily driven at 60 Hz in some cases. In addition, recently, display devices that support a variable refresh rate (VRR) at which the display device is operated by decreasing a frame frequency to a frequency between 1 Hz and 30 Hz in a low-speed driving mode and increasing the frame frequency to 144 Hz in the case of high resolution images (e.g., a gaming mode) have been developed.

The timing controller 200 may output serial image data Sdata provided to the data driver 400, a command signal CMD for controlling the data driver 400, a gate control signal GCS for controlling the gate driver 300, and a gamma control signal GMCS for driving the gamma driver 600 based on the received timing signals Vsync, Hsync, and Clk.

The gate driver 300 may be implemented as a gate in panel (GIP) circuit formed directly on the display panel 100 together with a TFT array of a pixel array and lines. The gate driver 300 may sequentially output the gate signals to the gate lines GL under the control of the timing controller 200. The gate driver 300 may sequentially output the signals to the plurality of gate lines GL by shifting the gate signals using a shift register.

The data driver 400 may convert pixel data of the input images received as digital signals from the timing controller 200 every frame period using a digital-to-analog converter (not shown) and gamma reference voltages GMAV1 to GMAV10 provided from the gamma driver 600 into gamma compensation voltages and output data voltages. The data driver 400 may be implemented as a plurality of source drive integrated circuits. The data driver 400 may be electrically connected to the data lines DL of the display panel 100 through a chip on glass (COG) process or a tape automated bonding (TAB) process.

The power driver 500 may output DC powers required to drive the pixel array of the display panel 100 and the drivers 300, 400, and 600 using a DC-DC converter. The power driver 500 may receive a DC input voltage Vin and output DC voltages such as a gate high voltage VGH, a gate low voltage VGL, a high potential power voltage ELVDD, a low potential power voltage ELVSS, a high potential reference voltage VDD, etc.

Specifically, the gate high voltage VGH is a voltage set to threshold voltages or more of transistors formed in an array of sub-pixels SP. The gate high voltage VGH may be output to the gate driver 300 and supplied to the level shifter in the gate driver 300.

The gate low voltage VGL is a voltage smaller than the threshold voltages of the transistors formed in the array of the sub-pixels SP. The gate low voltage VGL may be supplied to the level shifter in the gate driver 300.

The high potential power voltage ELVDD is a voltage supplied to an anode of a light emitting element and is a positive voltage for driving the light emitting element. The high potential power voltage ELVDD may be supplied to a high potential power voltage line connected to each sub-pixel SP in the display panel 100.

The low potential power voltage ELVSS is a voltage supplied to a cathode of a light emitting element and is a negative voltage for driving the light emitting element. The low potential power voltage ELVSS may be supplied to a low potential power voltage line connected to each sub-pixel SP in the display panel 100.

The high potential reference voltage VDD is a voltage output to the gamma driver 600. The high potential reference voltage VDD may be used as a reference voltage for generating the gamma reference voltages GMAV1 to GMAV10.

The gamma driver 600 may receive the high potential reference voltage VDD output from the power driver 500. The gamma driver 600 may receive the gamma control signal GMCS from the timing controller 200 and generate the gamma reference voltages GMAV1 to GMAV10 having values between the high potential reference voltage VDD and the ground voltage (0 V), and the data driver 400 may output data voltages based on the gamma reference voltages GMAV1 to GMAV10.

Figure 2:
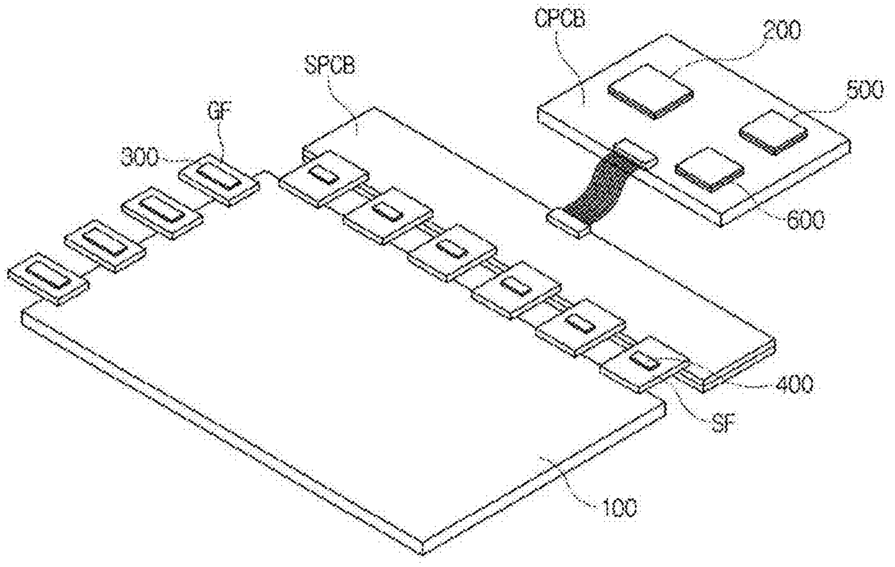
FIG. 2 is an exemplary view showing systematic implementation of the display device according to the embodiments of the present disclosure.

FIG. 2 is an exemplary view showing systematic implementation of the display device according to the embodiments of the present disclosure.

Referring to FIG. 2, each of the plurality of data drivers 400 may be mounted on a source film SF and electrically connected to the display panel 100. One side of the source film SF may be connected to the display panel 100, and the other side may be connected to a source printed circuit board SPCB.

Each of the plurality of gate drivers 300 may be mounted on a gate film GF and electrically connected to the display panel 100.

The timing controller 200, the power driver 500, the gamma driver 600, etc., may be mounted on a control printed circuit board CPCB. The timing controller 200 may control operations of the data driver 400, the gate driver 300, etc., and the power driver 500 may supply various voltages or currents to the display panel 100, the data driver 400, the gate driver 300, etc., or control various voltages or currents to be supplied to the display panel 100, the data driver 400, the gate driver 300, etc. The gamma driver 600 may receive the gamma control signal GMCS from the timing controller 200 and generate the gamma reference voltages GMAV1 to GMAV10.

The at least one source printed circuit board SPCB and the control printed circuit board CPCB may be circuitally connected through at least one connection member. Here, the connection member may be, for example, a flexible printed circuit (FPC), a flexible flat cable (FFC), etc. In addition, the source printed circuit board SPCB and the control printed circuit board CPCB may be implemented by being integrated into one printed circuit board.

Figure 3:
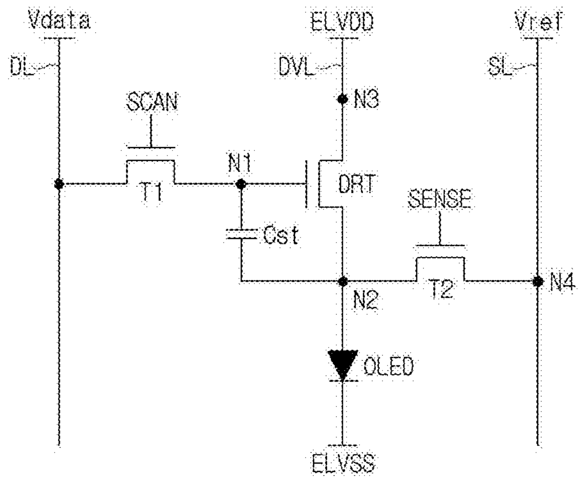
FIG. 3 is a circuit diagram showing a sub-pixel circuit of the display device according to the embodiments of the present disclosure.

FIG. 3 is a circuit diagram showing a sub-pixel circuit of the display device according to the embodiments of the present disclosure.

In the display panel 100 according to the embodiments of the present disclosure, a plurality of data lines DL, a plurality of gate lines GL, a plurality of driving voltage lines DVL, a plurality of sensing lines SL, etc., may be disposed.

Each sub-pixel SP in the display panel 100 may include an organic light emitting diode OLED, a driving transistor DRT for driving the organic light emitting diode OLED, a first transistor T1 electrically connected between a first node N1 of the driving transistor DRT and the corresponding data line DL, a second transistor T2 electrically connected between a second node N2 of the driving transistor DRT and the corresponding sensing line SL among a plurality of sensing lines SL, a storage capacitor Cst electrically connected between the first node N1 and the second node N2 of the driving transistor DRT, etc.

The organic light emitting diode OLED may include an anode, an organic light emitting layer, a cathode, etc.

Referring to FIG. 3, the anode of the organic light emitting diode OLED may be electrically connected to the second node N2 of the driving transistor DRT. The low potential power voltage ELVSS may be applied to the cathode of the organic light emitting diode OLED.

Here, the low potential power voltage ELVSS may be, for example, a ground voltage or a higher or lower voltage than the ground voltage. In addition, the low potential power voltage ELVSS may be changed depending on a driving state. For example, the low potential power voltage ELVSS during imaging driving and the low potential power voltage ELVSS during sensing driving may be set differently.

The driving transistor DRT drives the organic light emitting diode OLED by supplying a driving current to the organic light emitting diode OLED.

The driving transistor DRT may include the first node N1, the second node N2, a third node N3, etc.

The first node N1 of the driving transistor DRT may be a gate node and may be electrically connected to a source node or drain node of the first transistor T1. The second node N2 of the driving transistor DRT may be a source node or a drain node, electrically connected to an anode (or a cathode) of the organic light emitting diode OLED, and electrically connected to a source node or drain node of the second transistor T2. The third node N3 of the driving transistor DRT may be a drain node or a source node, may receive the high potential power voltage ELVDD, and may be electrically connected to a driving voltage line DVL through which the high potential power voltage ELVDD is supplied. Hereinafter, for convenience of description, an example in which in the driving transistor DRT, the first node N1 is a gate node, the second node N2 is a source node, and the third node N3 is a drain node may be described.

The storage capacitor Cst may be electrically connected between the first node N1 and the second node N2 of the driving transistor DRT to maintain a data voltage Vdata corresponding to an image signal voltage or a voltage corresponding thereto for a frame time (or a set time).

The drain node or source node of the first transistor T1 may be electrically connected to the corresponding data line DL, the source node or drain node of the first transistor T1 may be electrically connected to the first node N1 of the driving transistor DRT, and the gate node of the first transistor T1 may be electrically connected to the corresponding gate line to receive a scan signal SCAN.

The first transistor T1 may be controlled to be turned on and off by receiving the scan signal SCAN at the gate node through the corresponding gate line.

The first transistor T1 may be turned on by the scan signal SCAN to transmit the data voltage Vdata supplied from the corresponding data line DL to the first node N1 of the driving transistor DRT.

The drain node or source node of the second transistor T2 may be electrically connected to the sensing line SL, and the source node or drain node of the second transistor T2 may be electrically connected to the second node N2 of the driving transistor DRT. The gate node of the second transistor T2 may be electrically connected to the corresponding gate line to receive a sense signal SENSE.

The second transistor T2 may be controlled to be turned on and off by receiving the sense signal SENSE at the gate node through the corresponding gate line.

The second transistor T2 may be turned on by the sense signal SENSE to transmit a reference voltage Vref supplied from the corresponding sensing line SL to the second node N2 of the driving transistor DRT.

Meanwhile, the storage capacitor Cst may be an external capacitor intentionally designed outside the driving transistor DRT rather than parasitic capacitors (e.g., Cgs and Cgd) that are internal capacitors present between the first node N1 and the second node N2 of the driving transistor DRT.

The driving transistor DRT, the first transistor T1, and the second transistor T2 may each be an n-type transistor or a p-type transistor.

Meanwhile, the scan signal SCAN and the sense signal SENSE may be separate gate signals. In this case, the scan signal SCAN and the sense signal SENSE may be applied to the gate node of the first transistor T1 and the gate node of the second transistor T2, respectively, through different gate lines.

In some cases, the scan signal SCAN and the sense signal SENSE may be the same gate signal. In this case, the scan signal SCAN and the sensing signal SENSE may be commonly applied to the gate node of the first transistor T1 and the gate node of the second transistor T2, respectively, through the same gate line.

A structure of each sub-pixel shown in FIG. 3 has a 3T (transistor) 1C (capacitor) structure, which is only an example for description, and the sub-pixel may further include one or more transistors or in some cases, one or more capacitors. Alternatively, each of the plurality of sub-pixels may have the same structure, and some of the plurality of sub-pixels may have different structures.

The driving transistor DRT disposed in each of the plurality of sub-pixels SP arranged in the display panel 100 according to the embodiments of the present disclosure has unique characteristic values such as a threshold voltage and mobility (also referred to as "electron mobility")

The driving transistor DRT may be degraded according to a driving time. Therefore, the unique characteristic values of the driving transistor DRT may be changed depending on the driving time.

The ON-OFF timing of the driving transistor DRT may be changed, or the driving capability of the organic light emitting diode OLED may be changed depending on changes in characteristic values. In other words, the driving transistor DRT may have the timing of a current supplied to the organic light emitting diode OLED and the amount of current supplied to the organic light emitting diode OLED that are changed depending on the changes in characteristic values. According to the changes in characteristic values of the driving transistor DRT, an actual luminance of the corresponding sub-pixel SP may differ from a desired luminance.

In addition, the plurality of sub-pixels SP arranged on the display panel 100 may have different driving times. Therefore, a difference in characteristic values (difference in threshold voltages or difference in mobilities) may occur between the driving transistors DRT in each sub-pixel SP.

The difference in characteristic values between the driving transistors DRT may cause luminance deviation between the sub-pixels SP. Therefore, the luminance uniformity of the display panel 100 may be also degraded, eventually leading to the degradation of image quality.

Therefore, the display device according to the embodiments of the present disclosure may include a compensation circuit for compensating the difference in characteristic values between driving transistors DRT and provide a compensating method using the same. This will be described in more detail with reference to FIGS. 4 to 7.

Figure 4:
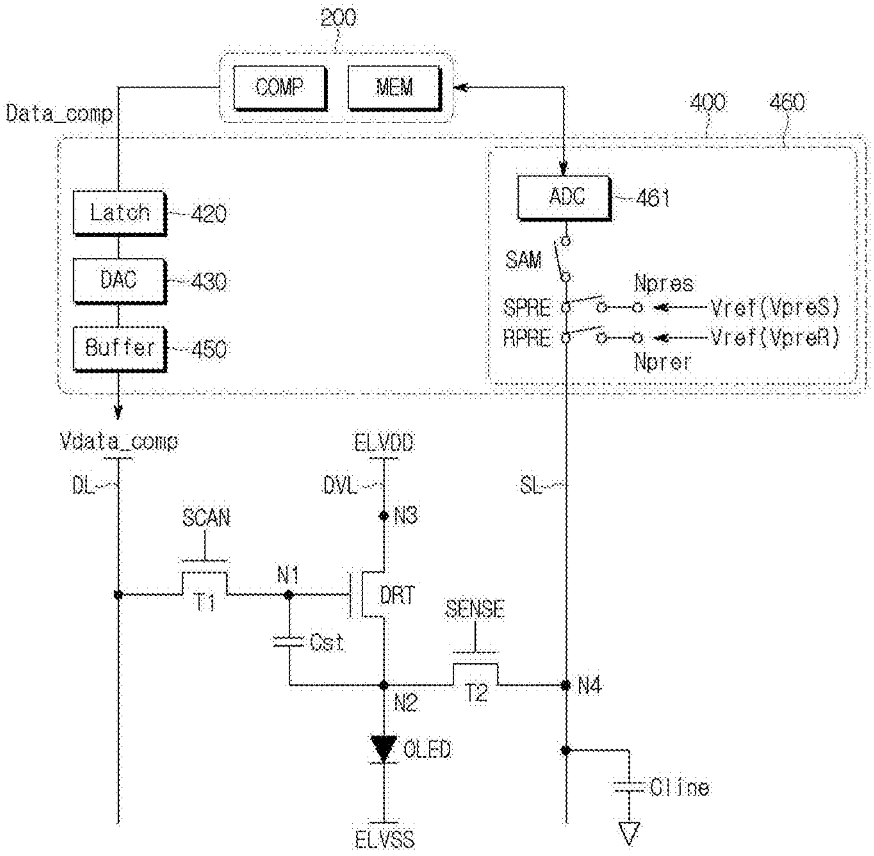
FIG. 4 is a view showing a compensation circuit of the display device according to the embodiments of the present disclosure.

FIG. 4 is a view showing a compensation circuit of the display device according to the embodiments of the present disclosure.

The display device according to the embodiments of the present disclosure should sense the characteristic value or a change in characteristic value of each driving transistor DRT to compensate the difference in characteristic values between the driving transistors DRT.

The compensation circuit of the display device according to the embodiments of the present disclosure may include a sensing circuit 460 for sensing the characteristic values or the changes in characteristic values of the driving transistor DRT in the sub-pixel SP to drive (sense) the sub-pixel SP having a 3T1C structure or a structure modified based on the same.

In the present specification, for convenience of description, "sensing the characteristic values or changes in characteristic values of the driving transistor DRT in the sub-pixel SP" is also referred to as "sensing the sub-pixel SP." In addition, "compensating the characteristics or the changes in characteristic values of the driving transistor DRT in the sub-pixel SP" is also referred to as "compensating the sub-pixel SP."

The display device according to the embodiments of the present disclosure may sense a voltage of the sensing line SL through the sensing driving and identify the characteristic values or the changes in characteristic values of the driving transistor DRT in the sub-pixel SP from the sensed voltage. Here, the sensing line SL may serve to transmit the reference voltage Vref and serve as the sensing line for sensing the characteristics (e.g., the characteristic values of the driving transistor DRT) of the sub-pixel. Therefore, the sensing line SL may also be referred to as a reference voltage line because it also serves to transmit the reference voltage Vref.

More specifically, according to the sensing driving of the display device according to the embodiments of the present disclosure, the characteristic values or changes in characteristic values of the driving transistor DRT are reflected to the voltage (e.g., Vdata-Vth) at the second node N2 of the driving transistor DRT.

When the second transistor T2 is in a turned-on state, the voltage at the second node N2 of the driving transistor DRT may correspond to the voltage of the sensing line SL. A line capacitor Cline disposed on the sensing line SL may be charged by the voltage at the second node N2 of the driving transistor DRT. Due to the charged line capacitor Cline, the sensing line SL may have a voltage corresponding to the voltage at the second node N2 of the driving transistor DRT.

The compensation circuit of the display device according to the embodiments of the present disclosure may be driven so that the second node N2 of the driving transistor DRT becomes a voltage state reflecting the characteristic values (threshold voltage and mobility) or the changes in characteristic values of the driving transistor DRT through the ON-OFF control of each of the first transistor T1 and the second transistor T2 in the sub-pixel SP to be sensed and the supply control of each of the data voltage Vdata and the reference voltage Vref.

Referring to FIG. 4, the display device according to the embodiments of the present disclosure may include the sensing circuit 460 for sensing a plurality of sensing lines SL.

The sensing circuit 460 may include an analog-to-digital converter ADC for sensing the voltage of the sensing line SL corresponding to the voltage at the second node N2 of the driving transistor DRT and converting the sensed voltage into a sensing value corresponding to a digital value, and sensing driving switching circuits SAM and SPRE.

The sensing circuit 460 may be present outside (e.g., a PCB) the data driver 400, but may be included inside the data driver 400.

The sensing driving switch circuits SAM and SPRE may control the voltage state of the corresponding sensing line SL or control the connection of the corresponding sensing line SL to the analog-to-digital converter ADC.

The switch circuits SAM and SPRE for the sensing driving may include a sensing driving reference switch circuits SAM and SPRE may include the sensing driving reference switch SPRE for controlling the connection between each sensing line SL and a sensing driving reference voltage supply node Npres to which the reference voltage Vref is supplied, and the sampling switch SAM for controlling the connection between each sensing line SL and the analog-to-digital converter ADC.

The sensing driving reference switch SPRE is a switch used during the sensing driving. The reference voltage Vref supplied to the sensing line SL by the sensing driving reference switch SPRE is "second initialization voltage VpreS."

Meanwhile, referring to FIG. 4, the switch circuit may include an image driving reference switch RPRE used during the image driving.

The image driving reference switch RPRE may control the connection between each sensing line SL and an image driving reference voltage supply node Nprer to which the reference voltage Vref is supplied.

The image driving reference switch RPRE is a switch used during the image driving. The reference voltage Vref supplied to the sensing line SL by the image driving reference switch SPRE is "first initialization voltage VpreR."

The sensing driving reference switch SPRE and the image driving reference switch RPRE may be provided separately or implemented by being integrated into one. The second initialization voltage VpreS and the first initialization voltage VpreR may be the same voltage value or may be different voltage values.

The compensation circuit of the display device according to the embodiments of the present disclosure may further include a memory MEM for storing a sensing value output from the analog-to-digital converter ADC or in which a reference sensing value is stored in advance, and a compensator COMP for comparing the sensing value stored in the memory MEM with the reference sensing value and calculating a compensation value that compensates the difference in characteristic values. The compensation value calculated by the compensator COMP may be stored in the memory MEM.

The timing controller 200 may change the image data Data to be supplied to the data driver 400 using the compensation value calculated by the compensator COM and output changed image data Data_comp to the data driver 400.

Therefore, the data driver 400 may convert the changed image data Data_comp into a data voltage Vdata_comp in an analog signal forma through a digital-to-analog converter DAC and output the converted data voltage Vdata_comp to the corresponding data line DL through an output buffer BUF. Therefore, the difference in characteristic values (difference in threshold voltages or difference in mobilities) of the driving transistor DRT of the corresponding sub-pixel SP may be compensated.

Meanwhile, referring to FIG. 4, the data driver 400 may include a latch unit 420, a conversion unit 430, and a buffer unit 450 and in some cases, may further include the analog-to-digital converter ADC and various switches SAM, SPRE, and RPRE.

Alternatively, the analog-to-digital converter ADC and various switches SAM, SPRE, and RPRE may be located outside the data driver 400 rather than inside the data driver 400.

Referring to FIG. 4, the compensator COMP may be present outside the timing controller 200, but may be included inside the timing controller 200. In addition, the memory MEM may be located outside the timing controller 200 or implemented in the form of a register inside the timing controller 200.

Figure 5:
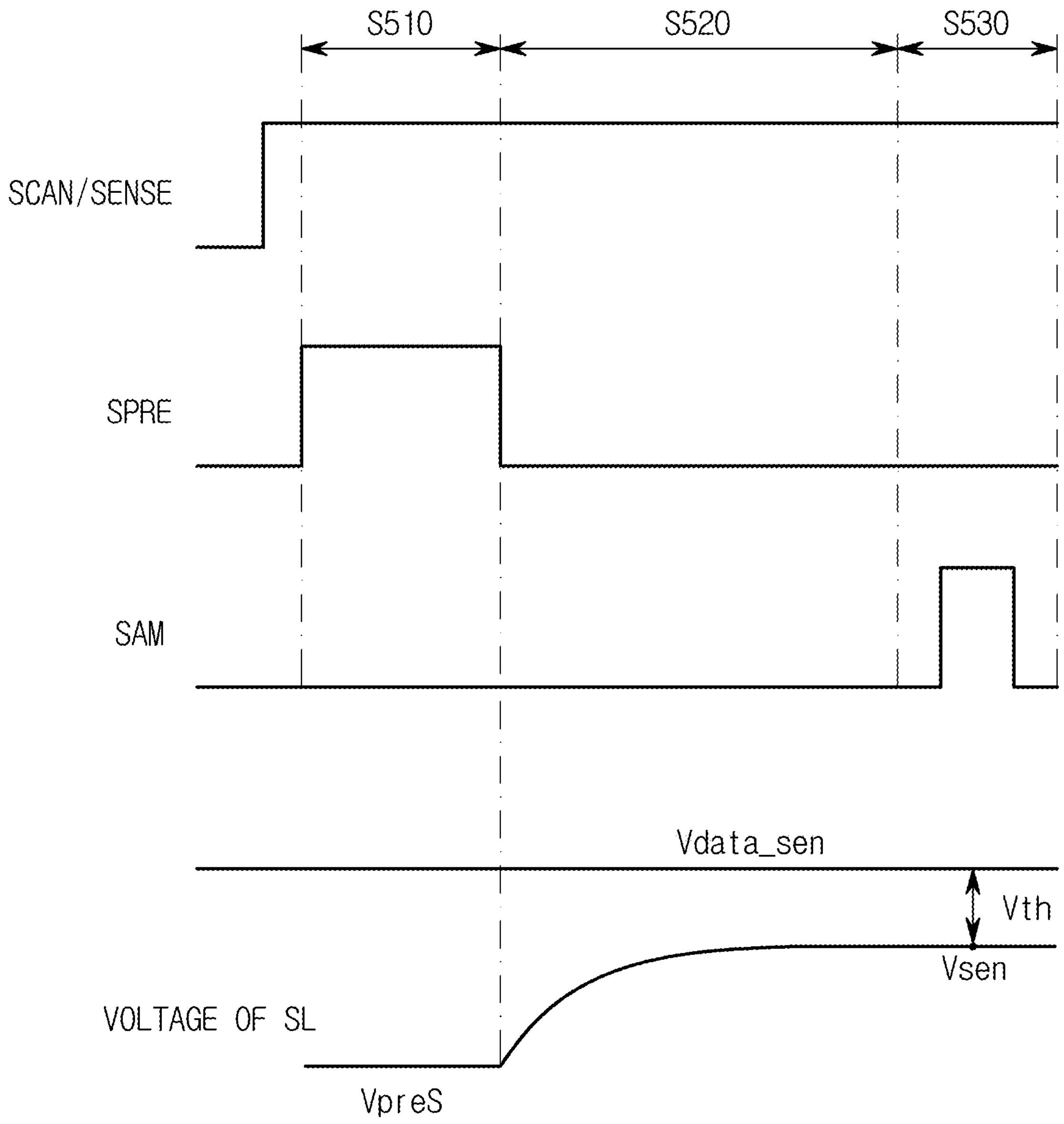
FIG. 5 is a driving timing diagram for threshold voltage sensing of the display device according to the embodiments of the present disclosure.

FIG. 5 is a driving timing diagram for sensing the threshold voltage of the display device according to the embodiments of the present disclosure.

Referring to FIG. 5, the threshold voltage sensing driving may include an initializing operation (S510), a tracking operation (S520), and a sampling operation (S530).

In the initializing operation (S510), the first transistor T1 is turned on by the scan signal SCAN at the turn-on level voltage. Therefore, the first node N1 of the driving transistor DRT is initialized to the threshold voltage sensing driving data voltage Vdata.

In the initializing operation (S510), the second transistor T2 is turned on by the sense signal SENSE at the turn-on level voltage, and the sensing driving reference switch SPRE is turned on. Therefore, the second node N2 of the driving transistor DRT is initialized to the second initialization voltage VpreS.

The tracking operation (S520) is an operation of tracking the threshold voltage Vth of the driving transistor DRT. In other words, in the tracking operation (S520), the voltage at the second node N2 of the driving transistor DRT reflecting the threshold voltage Vth of the driving transistor DRT is tracked.

In the tracking operation S520, the first transistor T1 and the second transistor T2 maintain the turned-on states, and the sensing driving reference switch SPRE is turned off. Therefore, the second node N2 of the driving transistor DRT becomes a floating state, and the voltage at the second node N2 of the driving transistor DRT starts to increase from the second initialization voltage VpreS.

Since the second transistor T2 is turned on, an increase in the voltage at the second node N2 of the driving transistor DRT leads to an increase in the voltage of the sensing line SL.

The voltage at the second node N2 of the driving transistor DRT increases and then becomes saturated. The saturated voltage at the second node N2 of the driving transistor DRT corresponds to a voltage difference (Vdata-Vth) between the threshold voltage sensing driving data voltage Vdata and the threshold voltage Vth of the driving transistor DRT.

Therefore, when the voltage at the second node N2 of the driving transistor DRT is saturated, the voltage of the sensing line SL corresponds to the voltage difference (Vdata-Vth) between the threshold voltage sensing driving data voltage Vdata and the threshold voltage of the driving transistor DRT.

When the voltage at the second node N2 of the driving transistor DRT becomes saturated, the sampling switch SAM is turned on, and the sampling operation (S530) is performed.

In the sampling operation (S530), the analog-to-digital converter ADC may sense the voltage of the sensing line SL connected by the sampling switch SAM and convert a sensed voltage Vsen into a sensing value corresponding to a digital value. Here, the voltage Vsen sensed by the analog-to-digital converter ADC corresponds to "Vdata-Vth."

The compensator COMP may identify the threshold voltage of the driving transistor DRT of the corresponding sub-pixel SP based on the sensing value output from the analog-to-digital converter ADC and compensate the identified threshold voltage of the driving transistor DRT.

The compensator COMP may identify the threshold voltage Vth of the driving transistor DRT from the sensing value (digital value corresponding to (Vdata-Vth)) measured through the sensing driving and the already known threshold voltage sensing driving data (digital value corresponding to Vdata).

The compensator COMP may compare the identified threshold voltage Vth of the corresponding driving transistor DRT with the reference threshold voltage or a threshold voltage of another driving transistors DRT and compensate a difference in threshold voltages between the driving transistors DRT. Here, the compensation of the difference in threshold voltages may mean image data change processing (processing of adding or subtracting a compensation value (offset) to or from the image data).

Figure 6:
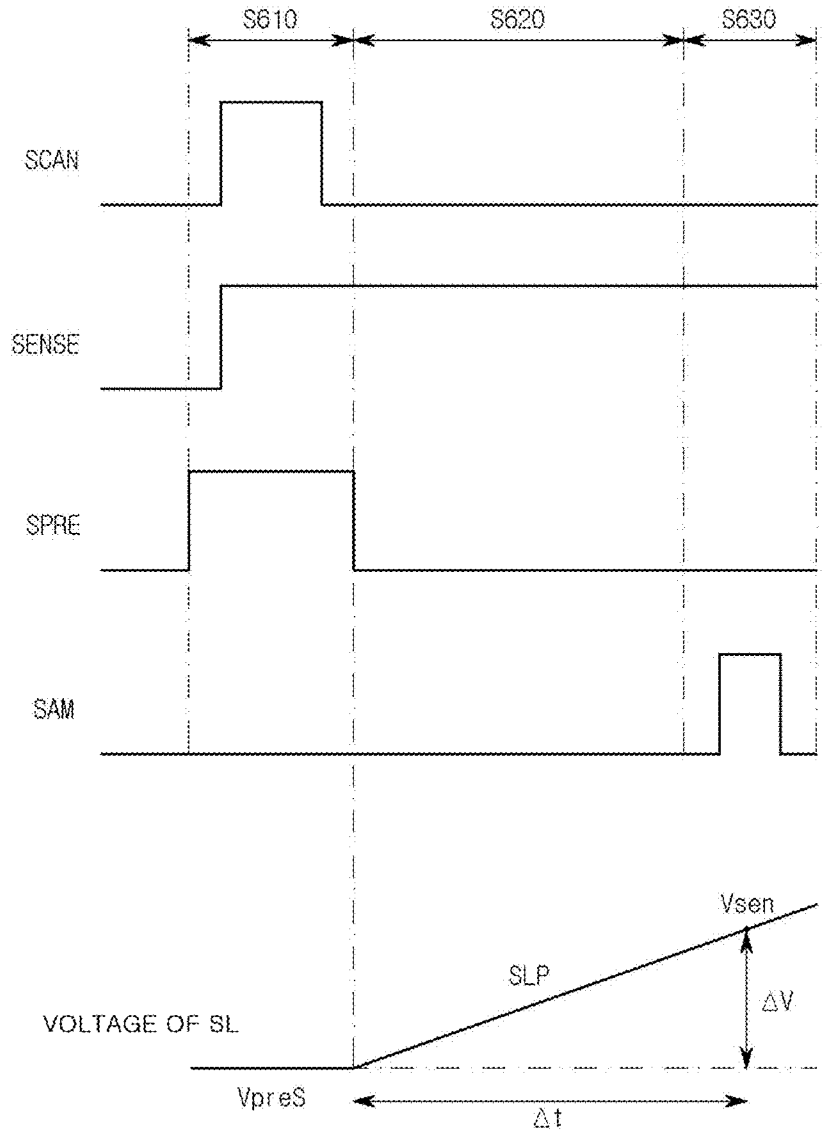
FIG. 6 is a driving timing diagram for mobility sensing of the display device according to the embodiments of the present disclosure.

FIG. 6 is a driving timing diagram for mobility sensing of the display device according to the embodiments of the present disclosure.

Referring to FIG. 6, the mobility sensing driving may include an initializing operation (S610), a tracking operation (S620), and a sampling operation (S630).

In the initializing operation (S610), the first transistor T1 become a turned-on state by the scan signal SCAN at the turn-on level voltage. Therefore, the first node N1 of the driving transistor DRT is initialized to the mobility sensing driving data voltage Vdata.

In the initializing operation (S610), the second transistor T2 become a turned-on state by the sense signal SENSE at the turn-on level voltage, and the sensing driving reference switch SPRE is turned on. Therefore, the second node N2 of the driving transistor DRT is initialized to the second initialization voltage VpreS.

The tracking operation (S620) is an operation of tracking the mobility of the driving transistor DRT. The mobility of the driving transistor DRT may indicate the current driving capability of the driving transistor DRT. In other words, in the tracking operation (S520), the voltage at the second node N2 of the driving transistor DRT capable of calculating the mobility of the driving transistor DRT is tracked.

In the initializing operation (S620), the first transistor T1 is turned off by the scan signal SCAN at the turn-off level voltage, and the sensing driving reference switch SPRE is turned off. Therefore, the first node N1 and the second node N2 of the driving transistor DRT both become a floating state. Therefore, the first node N1 and the second node N2 of the driving transistor DRT both become a floating state. In particular, the voltage at the second node N2 of the driving transistor DRT starts to increase from the second initialization voltage VpreS.

Since the second transistor T2 is turned on, an increase in the voltage at the second node N2 of the driving transistor DRT leads to an increase in the voltage of the sensing line SL.

When a predetermined time $\Delta t$ elapses from the time point at which the voltage at the second node N2 of the driving transistor DRT starts to increase, the sampling switch SAM is turned on, and the sampling operation (S630) is performed.

In the sampling operation (S630), the analog-to-digital converter ADC may sense the voltage of the sensing line SL connected by the sampling switch SAM and convert a sensed voltage Vsen into a sensing value corresponding to a digital value. Here, the voltage Vsen sensed by the analog-to-digital converter ADC corresponds to a voltage (VpreS+$\Delta$V) increased by a predetermined voltage $\Delta V$ from the second initialization voltage VpreS.

The compensator COMP may identify the mobility of the driving transistor DRT of the corresponding sub-pixel SP based on the sensing value output from the analog-to-digital converter ADC and compensate the identified mobility of the driving transistor DRT.

The compensator COMP may identify the mobility of the driving transistor DRT from the sensing value (digital value corresponding to VpreS+$\Delta$V) measured from the already known sensing driving and the second initialization voltage VpreS and elapsed time $\Delta t$.

The mobility of the driving transistor DRT is proportional to the voltage change per unit time ($\Delta V/\Delta t$) of the sensing line SL in the tracking operation (S620). In other words, the mobility of the driving transistor DRT is proportional to a slope SLP in a voltage waveform of the sensing line SL in FIG. 6.

The compensator COMP may compare the mobility identified with respect to the corresponding driving transistor DRT with the reference mobility or the mobility of another driving transistor DRT and compensate a difference in mobilities between the driving transistors DRT. Here, the compensation for the difference in mobilities may indicate image data change processing (calculation processing of multiplying image data by a compensation value (gain)).

Figure 7:
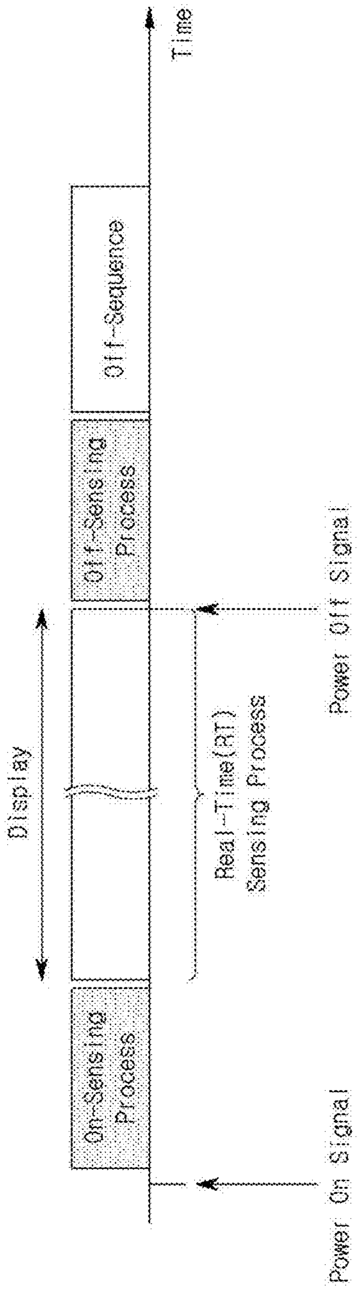
FIG. 7 is a timing diagram of a sensing processor that may be operated according to various timings in the display device according to the embodiments of the present disclosure.

FIG. 7 is a view showing a sensing process that may be performed at various timings in the display device according to the embodiments of the present disclosure.

Referring to FIG. 7, when the power-on signal is generated, the display device performs predetermined ON-sequence processing for starting the display driving, and when the ON-sequence processing is finished, normal display driving starts.

When the power-OFF signal is generated, the display device stops the display driving in progress and performs predetermined OFF-sequence processing, and when the OFF-sequence processing is finished, the display device is completely turned off.

The sensing driving (threshold voltage sensing driving or the mobility sensing driving) may be performed in relation to such a power processing timing.

The sensing driving may be performed before display driving starts after the power-on signal is generated. The sensing and sensing process are referred to as ON-sensing and ON-sensing process.

In addition, the sensing driving may be performed after the power-OFF signal is generated. The sensing and sensing process is referred to as OFF-sensing and OFF-sensing process.

In addition, the sensing driving may be performed in real time during the display driving. The sensing process is referred to as real-time (hereinafter referred to as RT) sensing process.

In the case of the RT sensing process, the sensing driving may be performed on one or more sub-pixels SP in one or more sub-pixel lines (sub-pixel rows) every blank time during the display driving.

When the sensing driving (RT sensing driving) is performed during the blank time, the sub-pixel line (sub-pixel row) on which the sensing driving is performed may be selected randomly. Therefore, it is possible to reduce the image abnormality phenomenon in the sub-pixel line subjected to the sensing driving during the active time after the sensing driving during the blank time. In addition, a recovery data voltage corresponding to the data voltage before the sensing driving may be performed on the sub-pixel subjected to the sensing driving during the active time after the sensing driving during the blank time. Therefore, it is possible to further reduce the image abnormality phenomenon in the sub-pixel line subjected to the sensing driving during the active time after the sensing driving during the blank time.

Meanwhile, since the threshold voltage sensing driving may need a long time to saturate the voltage at the second node N2 of the driving transistor DRT, it may be performed by the OFF-sensing process that may be performed for a slightly longer time.

Since the mobility sensing driving requires only a relatively short time compared to the threshold voltage sensing driving, it may be performed by the ON-sensing process and/or RT sensing process that are performed for a short time.

Although the threshold voltage sensing and/or the mobility sensing may be performed by the RT sensing process, hereinafter, for convenience of description, it is assumed that the mobility sensing is performed by the RT sensing process.

Meanwhile, one data voltage Vdata, two gate signals SCAN and SENSE, the reference voltage Vref, the high potential power voltage ELVDD, etc., should be supplied to one sub-pixel SP having the structure shown in FIG. 3. Therefore, one sub-pixel SP should be electrically connected to one data line DL, one or two gate lines GL, one sensing line SL, and one driving voltage line DVL (see FIG. 3).

To turn on and off one sub-pixel row, one or two gate lines GL should be disposed in each sub-pixel row. However, hereinafter, for convenience of description, it is assumed that two gate lines GL are disposed in one sub-pixel row. According to such assumption, the scan signal SCAN and the sense signal SENSE may each be transmitted through one of two gate lines GL.

In addition, since the data voltage Vdata should be supplied to each sub-pixel SP, one data line DL may be disposed in each sub-pixel column. In some cases, one data line DL may be commonly disposed per two sub-pixel columns.

Since the high potential power voltage ELVDD may be a common voltage, one driving voltage line DVL may be disposed in each sub-pixel column (or one sub-pixel row), and one driving voltage line DVL may be disposed in every two or more sub-pixel columns.

Likewise, since the reference voltage Vref may be a common voltage, one sensing line SL may be disposed in each sub-pixel column (or one sub-pixel row), and one sensing line SL may be disposed in every two or more sub-pixel columns (or two or more sub-pixel columns).

When one driving voltage line DVL and/or one sensing line SL are disposed in every two or more sub-pixel columns (or two or more sub-pixel columns), it is possible to further increase an aperture ratio of the display panel 100.

For example, when the display panel 100 is formed of sub-pixels that emit four colors (red, green, blue, and white), one sensing line SL may be disposed in each of the four sub-pixel columns. In this case, all sub-pixels included in the four sub-pixel columns may receive the reference voltage Vref from one sensing line SL or may be sensed through the one sensing line SL.

Figure 8:
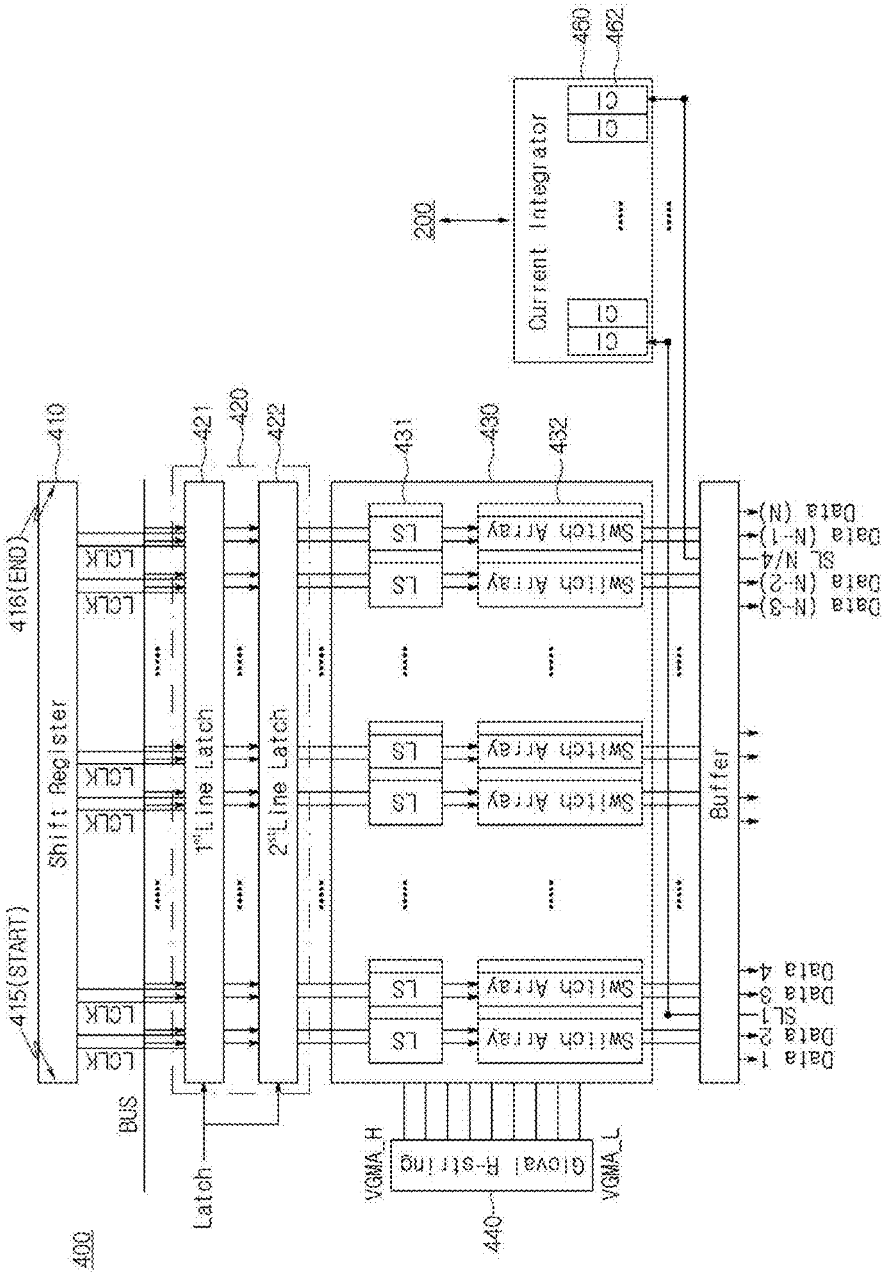
FIG. 8 is a block diagram showing an internal structure of a data driver according to the embodiments of the present disclosure.

FIG. 8 is a block diagram showing an internal structure of a data driver according to the embodiments of the present disclosure.

Referring to FIGS. 1 and 8, the data driver 400 may include a shift register 410, a latch unit 420, a conversion unit 430, a voltage divider 440, a buffer unit 450, and a sensing circuit 460.

The shift register 410 may generate a latch clock Lclk for latching the serial image data Sdata received from the timing controller 200. A start end 415 of the shift register 410 is a point at which the latch clock Lclk first operates, and an end 416 is a point at which the latch clock Lclk is operated by being shifted to reach the end. The image data Sdata is first latched by the latch clock Lclk at the start end 415 and input into the latch unit 420 and is sequentially input to the latch unit 420 up to the end 416 by the shifted latch clock Lclk.

The serial image data Sdata may be transmitted in the form of a data packet including pixel data of input images, a clock, a source output enable signal, etc. The latch unit 420 samples the serial image data Sdata according to the latch clock Lclk provided by the shift register 410 and converts the sampled serial image data into parallel data. In other words, the latch unit 420 may maintain per-one frame serial image data Sdata in an at least one channel basis and output the serial image data as parallel data. In FIG. 8, the shift register 410 is shown as a unit separately from the latch unit 420, but the latch unit 420 may include the shift register 410.

The latch unit 420 may include a latch start pulse Latch. The latch start pulse Latch may control a start time point at which the parallel data output of the latch unit 420 is supplied to the conversion unit 430. The parallel data output from the latch unit 420 may be data output simultaneously from a plurality of channels.

The conversion unit 430 may be a digital-to-analog converter DAC for converting a digital signal to an analog signal. The conversion unit 430 may convert digital parallel data into analog data using gamma compensation voltages V0 to V1023 for each color that are provided from the voltage divider 440. The conversion unit 430 may include an independent digital-to-analog converter DAC for each color. The conversion unit 430 may include a level shifter 431 and a switch array 432.

The voltage divider 440 receives the gamma reference voltages GMAV1 to GMAV10 from the gamma driver 600 and outputs the gamma compensation voltages V0 to V1023. The voltage divider 440 divides the gamma reference voltages GMAV1 to GMAV10 using a plurality of resistors connected in series and outputs the gamma compensation voltages V0 to V1023 set for each grayscale 0G to 1023G. The gamma compensation voltages V0 to V1023 are voltages optimized for each color according to a preset color gamma curve. To independently generate the gamma compensation voltages for each color, each of the gamma reference voltages GMAV1 to GMAV10 (R/G/B) of each color may include N gamma reference voltages having different voltage levels. For example, N may be 10.

The buffer unit 450 may output the data voltage Vdata to data lines Data 1 to Data N through output buffers Output 1 to Output N connected to an output node of the conversion unit 430 for each channel of the data driver 400.

Referring to FIG. 8, the buffer unit 450 may have a structure in which one of the sensing lines SL 1 to SL N/4 is disposed parallel to the data lines Data 1 to Data N every M data lines Data 1 to Data N. In FIG. 8, an example of M=4 is shown, but M may be 3 or 2.

The sensing lines SL 1 to SL N/4 may be connected to a current input device 462 inside the sensing circuit 460. After sensing a plurality of sensing lines SL and receiving the voltages through the current input device 462, the sensing circuit 460 may convert the sensed voltages into the digital values in the analog-to-digital converter ADC and transmit the digital values to the timing controller 200.

Figure 9:
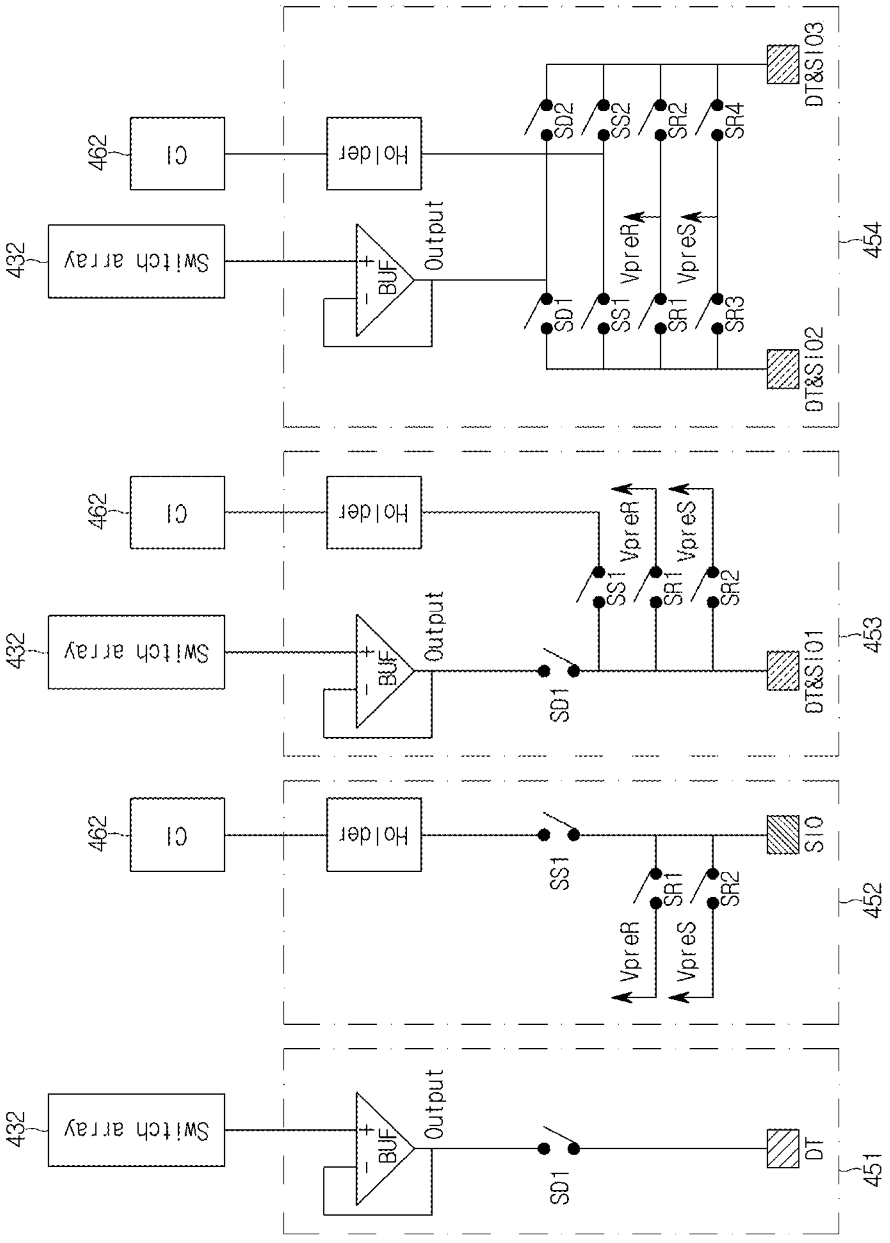
FIG. 9 is a circuit diagram of a first output part, a second output part, a third output part, and a fourth output part according to the embodiments of the present disclosure.

FIG. 9 is a circuit diagram of a first output part, a second output part, a third output part, and a fourth output part according to the embodiments of the present disclosure.

Referring to FIGS. 8 and 9, the buffer unit 450 may include a first output part 451, a second output part 452, a third output part 453, and a fourth output part 454. The buffer unit may include all of the first to fourth output parts 451 to 454 or include some output parts.

Referring to FIG. 9, the first output part 451 may include a buffer BUF, a first data switch SD1, and a data pad DT. The buffer BUF may have one end connected to the switch array 432 of the conversion unit 430 and the other end connected to the first data switch SD1. The first data switch SD1 may have one end connected to the buffer BUF and the other end connected to the data pad DT. The data pad DT may be included in the buffer unit 450 or disposed on the source film SF for mounting the data driver 400.

The second output part 452 may include a holder Holder, a first sensing switch SS1, a first voltage switch SR1, a second voltage switch SR2, and a sensing pad SIO. The holder Holder may have one end connected to the current input device 462 inside the sensing circuit 460 and the other end connected to the first sensing switch SS1. The first sensing switch SS1 may have one end connected to the holder Holder and the other end connected to the sensing pad SIO. The first voltage switch SR1 may have one end connected to the first initialization voltage VpreR and the other end connected to the sensing pad SIO. The second voltage switch SR2 may have one end connected to the second initialization voltage VpreS and the other end connected to the sensing pad SIO. The sensing pad SIO may be included in the buffer unit 450 or disposed on the source film SF for mounting the data driver 400.

The third output part 453 may include the buffer BUF, the holder Holder, the first data switch SD1, the first sensing switch SS1, the first voltage switch SR1, the second voltage switch SR2, and a first input/output pads DT & SIO1. The buffer BUF may have one end connected to the switch array 432 of the conversion unit 430 and the other end connected to the first data switch SD1. The holder may have one end connected to the current input device 462 inside the sensing circuit 460 and the other end connected to the first sensing switch SS1. The first data switch SD1 may have one end connected to the buffer BUF and the other end connected to the first input/output pad DT & SIO1. The first sensing switch SS1 may have one end connected to the holder Holder and the other end connected to the first input/output pad DT & SIO1. The first voltage switch SR1 may have one end connected to the first initialization voltage VpreR and the other end connected to the first input/output pad DT & SIO1. The second voltage switch SR2 may have one end connected to the second initialization voltage VpreS and the other end connected to the first input/output pad DT & SIO1. The first input/output pads DT & SIO1 may be included in the buffer unit 450 or disposed on the source film SF for mounting the data driver 400.

The fourth output part 454 may include the buffer BUF, the holder Holder, the first data switch SD1, a second data switch SD2, the first sensing switch SS1, a second sensing switch SS2, the first voltage switch SR1, the second voltage switch SR2, a third voltage switch SR3, a fourth voltage switch SR4, a second input/output pad DT & SIO2, and a third input/output pad DT & SIO3. The buffer BUF may have one end connected to the switch array 432 of the conversion unit 430 and the other end connected to the first data switch SD1. The holder Holder may have one end connected to the current input device 462 inside the sensing circuit 460 and the other end connected to the first sensing switch SS1. The first data switch SD1 may have one end connected to the buffer BUF and the other end connected to the second input/output pad DT & SIO2. The second data switch SD2 may have one end connected to the buffer BUF and the other end connected to the third input/output pad DT & SIO3. The first sensing switch SS1 may have one end connected to the holder Holder and the other end connected to the second input/output pad DT & SIO2. The second sensing switch SS2 may have one end connected to the holder Holder and the other end connected to the third input/output pad DT & SIO3. The first voltage switch SR1 may have one end connected to the first initialization voltage VpreR and the other end connected to the second input/output pad DT & SIO2. The second voltage switch SR2 may have one end connected to the first initialization voltage VpreR and the other end connected to the third input/output pad DT & SIO3. The third voltage switch SR3 may have one end connected to the second initialization voltage VpreS and the other end connected to the second input/output pad DT & SIO2. The fourth voltage switch SR4 may have one end connected to the second initialization voltage VpreS and the other end connected to the third input/output pad DT & SIO3. The second input/output pad DT & SIO2 and the third input/output pad DT & SIO3 may be included in the buffer unit 450 or disposed on the source film SF for mounting the data driver 400.

Figure 10:
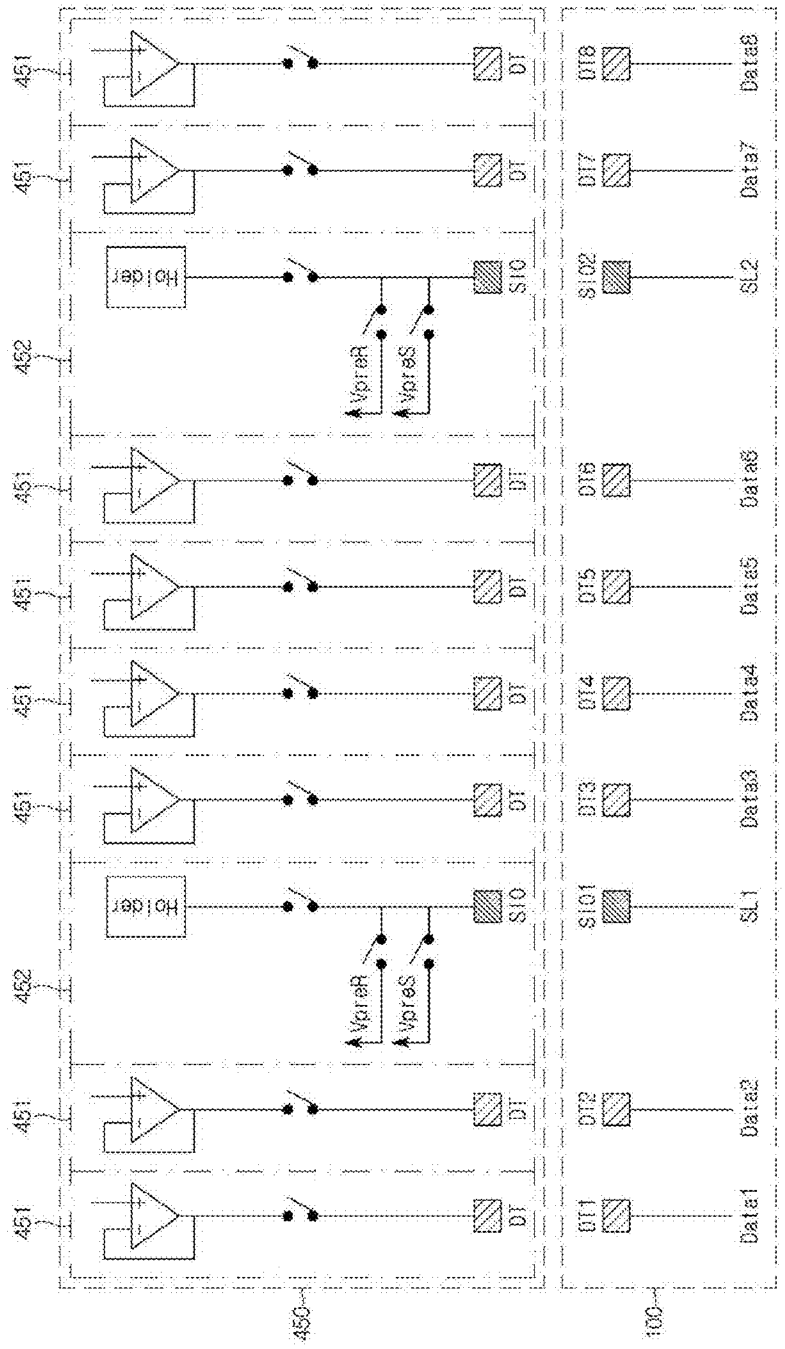
FIG. 10 is a circuit diagram showing a buffer unit of a 4:1 sensing circuit and the corresponding display panel according to a comparative example of the present disclosure.

FIG. 10 is a circuit diagram showing output parts of the buffer unit of a 4:1 sensing circuit and the corresponding display panel according to the comparative example of the present disclosure.

Referring to FIGS. 1, 8, and 10, the buffer unit 450 of the data driver 400 constituting the 4:1 sensing circuit may include the first output part 451, the first output part 451, the second output part 452, the first output part 451, and the first output part 451 that are disposed consecutively, and the corresponding display panel 100 may include a first data input pad DT1, a second data input pad DT2, a first sensing output pad SIO1, a third data input pad DT3, and a fourth data pad DT4 that are disposed consecutively.

Referring to FIG. 10, the data pad DT of the first output part 451 located at a first location of the buffer unit 450 may be electrically connected to the first data input pad DT1 located at a first location of the display panel 100. The buffer BUF may receive a data voltage from the switch array 432 of the conversion unit 430 and output the data voltage to the data pad DT. The first data input pad DT1 may receive a data voltage from the data pad DT and output the data voltage to a first data line Data 1.

The data pad DT of the first output part 451 located at a second location of the buffer unit 450 may be electrically connected to the second data input pad DT2 located at a second location of the display panel 100. The buffer BUF may receive the data voltage from the switch array 432 of the conversion unit 430 and output the data voltage to the data pad DT. The second data input pad DT2 may receive a data voltage from the data pad DT and output the data voltage to a second data line Data 2.

The sensing pad SIO of the second output part 452 located at a third location of the buffer unit 450 may be electrically connected to the first sensing output pad SIO1 located at a third location of the display panel 100. The first sensing output pad SIO1 may receive a sensing voltage from the first sensing line SL 1 and output the sensing voltage to the sensing pad SIO. The sensing pad SIO may be electrically connected to the holder Holder to transmit the sensing voltage to the current input device 462 inside the sensing circuit 460.

The data pad DT of the first output part 451 located at a fourth location of the buffer unit 450 may be electrically connected to the third data input pad DT3 located at a fourth location of the display panel 100. The buffer BUF may receive the data voltage from the switch array 432 of the conversion unit 430 and output the data voltage to the data pad DT. The third data input pad DT3 may receive a data voltage from the data pad DT and output the data voltage to a third data line Data 3.

The data pad DT of the first output part 451 located at a fifth location of the buffer unit 450 may be electrically connected to the fourth data input pad DT4 located at a fifth location of the display panel 100. The buffer BUF may receive the data voltage from the switch array 432 of the conversion unit 430 and output the data voltage to the data pad DT. The fourth data input pad DT4 may receive a data voltage from the data pad DT and output the data voltage to a fourth data line Data 4.

Figure 11:
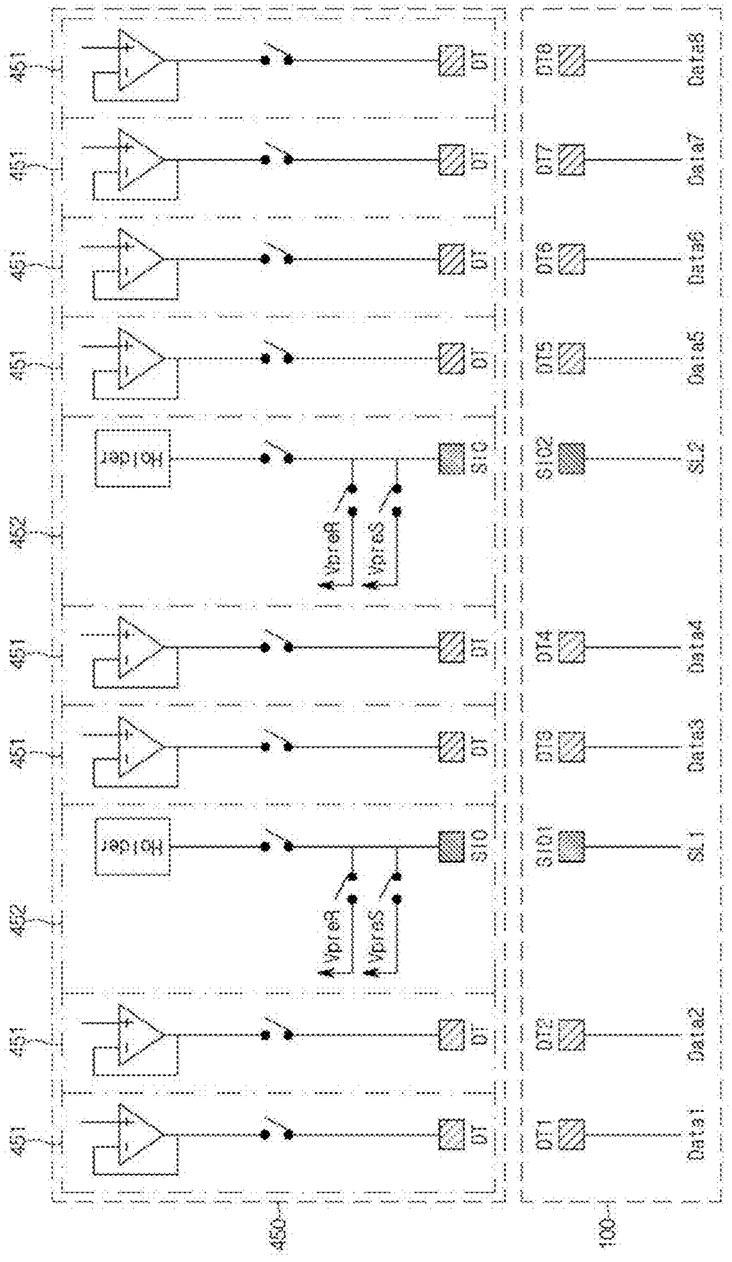
FIG. 11 is a circuit diagram showing a buffer unit of a 3:1 sensing circuit and the corresponding display panel according to the comparative example of the present disclosure.

FIG. 11 is a circuit diagram showing output parts of a buffer unit of a 3:1 sensing circuit and the corresponding display panel according to the comparative example of the present disclosure.

Referring to FIGS. 1, 8, and 11, the buffer unit 450 of the data driver 400 constituting the 3:1 sensing circuit may include the first output part 451, the first output part 451, the second output part 452, and the first output part 451 that are disposed consecutively, and the corresponding display panel 100 may include the first data input pad DT1, the second data input pad DT2, the first sensing output pad SIO1, and the third data input pad DT3 that are disposed consecutively.

Referring to FIG. 11, the data pad DT of the first output part 451 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The data pad DT of the first output part 451 located at the second location of the buffer unit 450 may be electrically connected to the second data input pad DT2 located at the second location of the display panel 100. The buffer BUF may receive the data voltage from the switch array 432 of the conversion unit 430 and output the data voltage to the data pad DT. The second data input pad DT2 may receive the data voltage from the data pad DT and output the data voltage to the second data line Data 2.

The sensing pad SIO of the second output part 452 located at the third location of the buffer unit 450 may be electrically connected to the first sensing output pad SIO1 located at a third location of the display panel 100. The first sensing output pad SIO1 may receive the sensing voltage from the first sensing line SL 1 and output the sensing voltage to the sensing pad SIO. The sensing pad SIO may be electrically connected to the holder Holder to transmit the sensing voltage to the current input device 462 inside the sensing circuit 460.

The data pad DT of the first output part 451 located at a fourth location of the buffer unit 450 may be electrically connected to the third data input pad DT3 located at a fourth location of the display panel 100. The buffer BUF may receive the data voltage from the switch array 432 of the conversion unit 430 and output the data voltage to the data pad DT. The third data input pad DT3 may receive the data voltage from the data pad DT and output the data voltage to the third data line Data 3.

Figure 12:
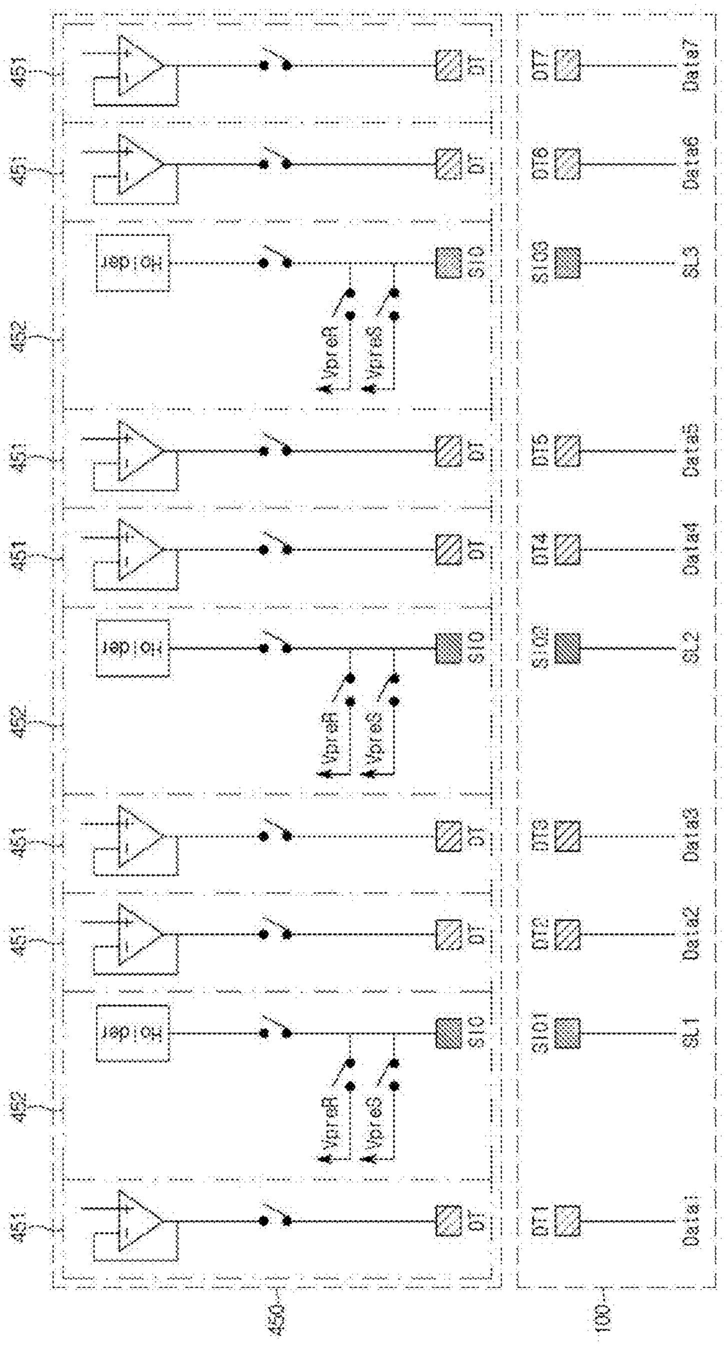
FIG. 12 is a circuit diagram showing a buffer unit of a 2:1 sensing circuit and the corresponding display panel according to the comparative example of the present disclosure.

FIG. 12 is a circuit diagram showing output parts of a buffer unit of a 2:1 sensing circuit and the corresponding display panel according to the comparative example of the present disclosure.

Referring to FIGS. 1, 8, and 12, the buffer unit 450 of the data driver 400 constituting the 2:1 sensing circuit may include the first output part 451, the second output part 452, and the first output part 451 that are disposed consecutively, and the corresponding display panel 100 may include the first data input pad DT1, the first sensing output pad SIO1, and the second data input pad DT2 that are disposed consecutively.

Referring to FIG. 11, the data pad DT of the first output part 451 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The sensing pad SIO of the second output part 452 located at the second location of the buffer unit 450 may be electrically connected to the first sensing output pad SIO1 located at the second location of the display panel 100. The first sensing output pad SIO1 may receive the sensing voltage from the first sensing line SL 1 and output the sensing voltage to the sensing pad SIO. The sensing pad SIO may be electrically connected to the holder Holder to transmit the sensing voltage to the current input device 462 inside the sensing circuit 460.

The data pad DT of the first output part 451 located at the third location of the buffer unit 450 may be electrically connected to the second data input pad DT2 located at the third location of the display panel 100. The buffer BUF may receive the data voltage from the switch array 432 of the conversion unit 430 and output the data voltage to the data pad DT. The second data input pad DT2 may receive the data voltage from the data pad DT and output the data voltage to the second data line Data 2.

Figure 13:
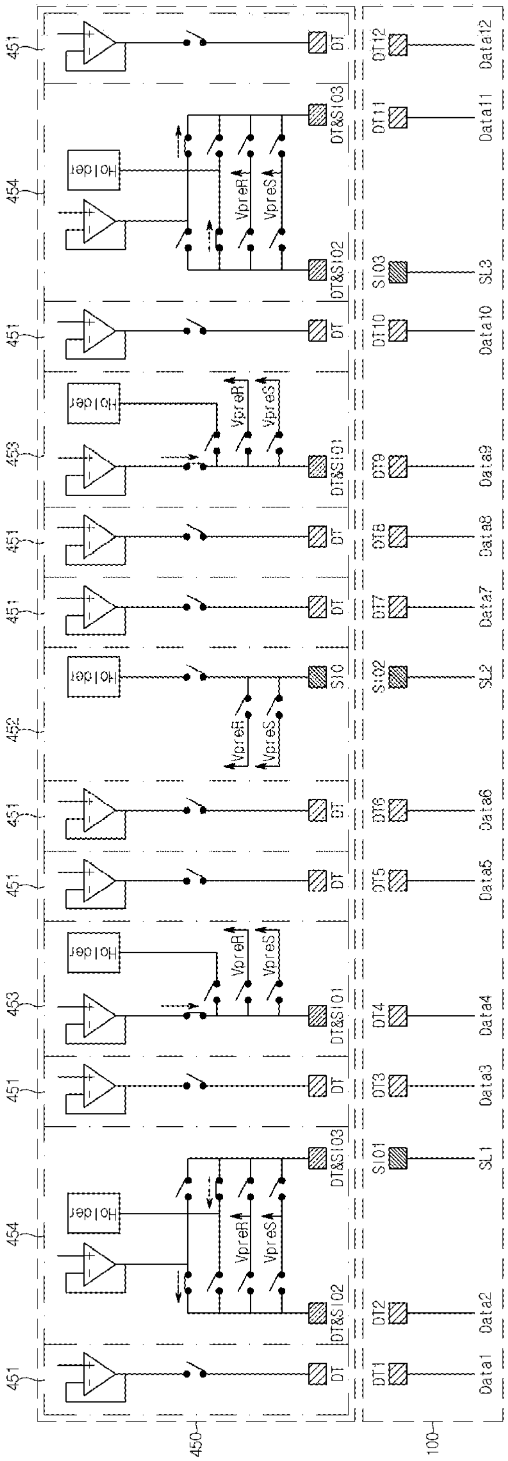
FIG. 13 is a circuit diagram showing that a buffer unit of a 4:1 sensing and 2:1 sensing common circuit is used as the 4:1 sensing circuit according to a first embodiment of the present disclosure.

FIG. 13 is a circuit diagram showing that a buffer unit of a 4:1 sensing and 2:1 sensing common circuit is used as the 4:1 sensing circuit according to a first embodiment of the present disclosure.

Referring to FIGS. 1, 8, and 13, the buffer unit 450 of the data driver 400 constituting the 4:1 sensing and 2:1 sensing common circuit may include the first output part 451, the fourth output part 454, the first output part 451, the third output part 453, the first output part 451, the first output part 451, and the second output part 452 that are disposed consecutively, and the corresponding display panel 100 may include the first data input pad DT1, the second data input pad DT2, the first sensing output pad SIO1, the third data input pad DT3, the fourth data input pad DT4, a fifth data input pad DT5, a sixth data input pad DT6, and a second sensing output pad SIO2 that are disposed consecutively.

Referring to FIG. 13, the data pad DT of the first output part 451 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The second input/output pad DT & SIO2 of the fourth output part 454 located at the second location of the buffer unit 450 may be electrically connected to the second data input pad DT2 located at the second location of the display panel 100. The buffer BUF may receive the data voltage from the switch array 432 of the conversion unit 430 and output the data voltage to the second input/output pad DT & SIO2. The second data input pad DT2 may receive the data voltage from the second input/output pad DT & SIO2 and output the data voltage to the second data line Data 2.

The third input/output pad DT & SIO3 of the fourth output part 454 located at the second location of the buffer unit 450 may be electrically connected to the first data input pad SIO1 located at the third location of the display panel 100. The first sensing output pad SIO1 may receive the sensing voltage from the first sensing line SL1 and output the sensing voltage to the third input/output pad DT & SIO3. The third input/output pad DT & SIO3 may be electrically connected to the holder Holder to transmit the sensing voltage to the current input device 462 inside the sensing circuit 460.

The data pad DT of the first output part 451 located at the third location of the buffer unit 450 may be electrically connected to the third data input pad DT3 located at the fourth location of the display panel 100. The buffer BUF may receive the data voltage from the switch array 432 of the conversion unit 430 and output the data voltage to the data pad DT. The third data input pad DT3 may receive the data voltage from the data pad DT and output the data voltage to the third data line Data 3.

The first input/output pad DT & SIO1 of the third output part 453 located at the fourth location of the buffer unit 450 may be electrically connected to the fourth data input pad DT4 located at the fifth location of the display panel 100. The buffer BUF may receive the data voltage from the switch array 432 of the conversion unit 430 and output the data voltage to the first input/output pad DT & SIO1. The fourth data input pad DT4 may receive the data voltage from the first input/output pad DT & SIO1 and output the data voltage to the fourth data line Data 4.

The data pad DT of the first output part 451 located at the fifth location of the buffer unit 450 may be electrically connected to the fifth data input pad DT5 located at a sixth location of the display panel 100. The buffer BUF may receive the data voltage from the switch array 432 of the conversion unit 430 and output the data voltage to the data pad DT. The fifth data input pad DT5 may receive the data voltage from the data pad DT and output the data voltage to a fifth data line Data 5.

The data pad DT of the first output part 451 located at a sixth location of the buffer unit 450 may be electrically connected to the sixth data input pad DT6 located at a seventh location of the display panel 100. The buffer BUF may receive the data voltage from the switch array 432 of the conversion unit 430 and output the data voltage to the data pad DT. The sixth data input pad DT6 may receive the data voltage from the data pad DT and output the data voltage to a sixth data line Data 6.

The sensing pad SIO of the second output part 452 located at the seventh location of the buffer unit 450 may be electrically connected to the second sensing output pad SIO2 located at the eighth location of the display panel 100. The second sensing output pad SIO2 may receive the sensing voltage from the second sensing line SL2 and output the sensing voltage to the sensing pad SIO. The sensing pad SIO may be electrically connected to the holder Holder to transmit the sensing voltage to the current input device 462 inside the sensing circuit 460.

Figure 14:
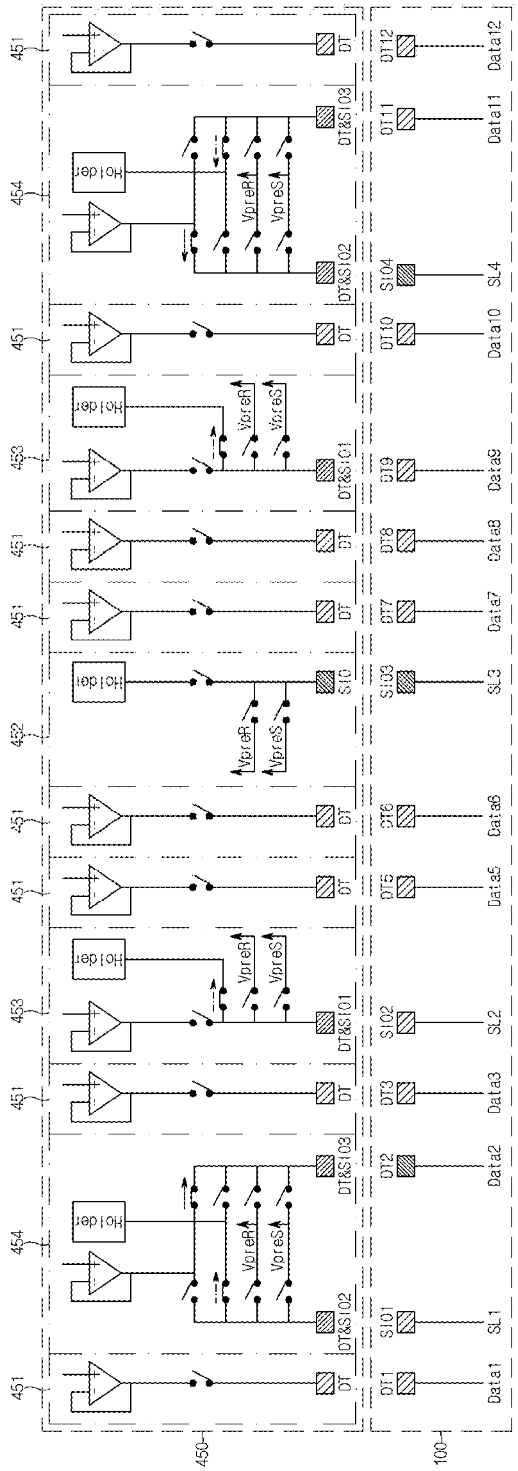
FIG. 14 is a circuit diagram showing that the buffer unit of the 4:1 sensing and 2:1 sensing common circuit is used as the 2:1 sensing circuit according to the first embodiment of the present disclosure.

FIG. 14 is a circuit diagram showing that the buffer unit of the 4:1 sensing and 2:1 sensing common circuit is used as the 2:1 sensing circuit according to the first embodiment of the present disclosure.

Referring to FIGS. 1, 8, and 14, the buffer unit 450 of the data driver 400 constituting the 4:1 sensing and 2:1 sensing common circuit may include the first output part 451, the fourth output part 454, the first output part 451, the third output part 453, the first output part 451, the first output part 451, and the second output part 452 that are disposed consecutively, and the corresponding display panel 100 may include the first data input pad DT1, the first sensing output pad SIO1, the second data input pad DT2, the third data input pad DT3, the second sensing output pad SIO2, the fifth data input pad DT5, the sixth data input pad DT6, and a third sensing output pad SIO3 that are disposed consecutively.

Referring to FIG. 14, the data pad DT of the first output part 451 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The second input/output pad DT & SIO2 of the fourth output part 454 located at the second location of the buffer unit 450 may be electrically connected to the first sensing output pad SIO1 located at the second location of the display panel 100. The first sensing output pad SIO1 may receive the sensing voltage from the first sensing line SL1 and output the sensing voltage to the second input/output pad DT & SIO2. The second input/output pad DT & SIO2 may be electrically the sensing circuit 460.

The third input/output pad DT & SIO3 of the fourth output part 454 located at the second location of the buffer unit 450 may be electrically connected to the second data input pad DT2 located at the third location of the display panel 100. The buffer BUF may receive the data voltage from the switch array 432 of the conversion unit 430 and output the data voltage to the third input/output pad DT & SIO3. The second data input pad DT2 may receive the data voltage from the third input/output pad DT & SIO3 and output the data voltage to the second data line Data 2.

The data pad DT of the first output part 451 located at the third location of the buffer unit 450 may be electrically connected to the third data input pad DT3 located at the fourth location of the display panel 100. The buffer BUF may receive the data voltage from the switch array 432 of the conversion unit 430 and output the data voltage to the data pad DT. The third data input pad DT3 may receive the data voltage from the data pad DT of the third input/output pad DT & SIO3 and output the data voltage to the third data line Data 3.

The first input/output pad DT & SIO1 of the third output part 453 located at the fourth location of the buffer unit 450 may be electrically connected to the second sensing output pad SIO2 located at the fifth location of the display panel 100. The second sensing output pad SIO2 may receive the sensing voltage from the second sensing line SL2 and output the sensing voltage to the first input/output pad DT & SIO1. The first input/output pad DT & SIO1 may be electrically connected to the holder Holder to transmit the sensing voltage to the current input device 462 inside the sensing circuit 460.

The data pad DT of the first output part 451 located at the fifth location of the buffer unit 450 may be electrically connected to the fifth data input pad DT5 located at the sixth location of the display panel 100. The buffer BUF may receive the data voltage from the switch array 432 of the conversion unit 430 and output the data voltage to the data pad DT. The fifth data input pad DT5 may receive the data voltage from the data pad DT and output the data voltage to the fifth data line Data 5.

The data pad DT of the first output part 451 located at a sixth location of the buffer unit 450 may be electrically connected to the sixth data input pad DT6 located at the seventh location of the display panel 100. The buffer BUF may receive the data voltage from the switch array 432 of the conversion unit 430 and output the data voltage to the data pad DT. The sixth data input pad DT6 may receive the data voltage from the data pad DT and output the data voltage to the sixth data line Data 6.

The sensing pad SIO of the second output part 452 located at the seventh location of the buffer unit 450 may be electrically connected to the third sensing output pad SIO3 located at the eighth location of the display panel 100. The third sensing output pad SIO3 may receive the sensing voltage from the third sensing line SL3 and output the sensing voltage to the sensing pad SIO. The sensing pad SIO may be electrically connected to the holder Holder to transmit the sensing voltage to the current input device 462 inside the sensing circuit 460.

Referring to FIGS. 13 and 14, by consecutively arranging the first output part 451, the fourth output part 454, the first output part 451, the third output part 453, the first output part 451, the first output part 451, and the second output part 452 in the buffer unit 450 of the data driver 400, it is possible to reduce the cost using the data driver 400 commonly for the 4:1 sensing and 2:1 sensing without additionally changing hardware.

Figure 15:
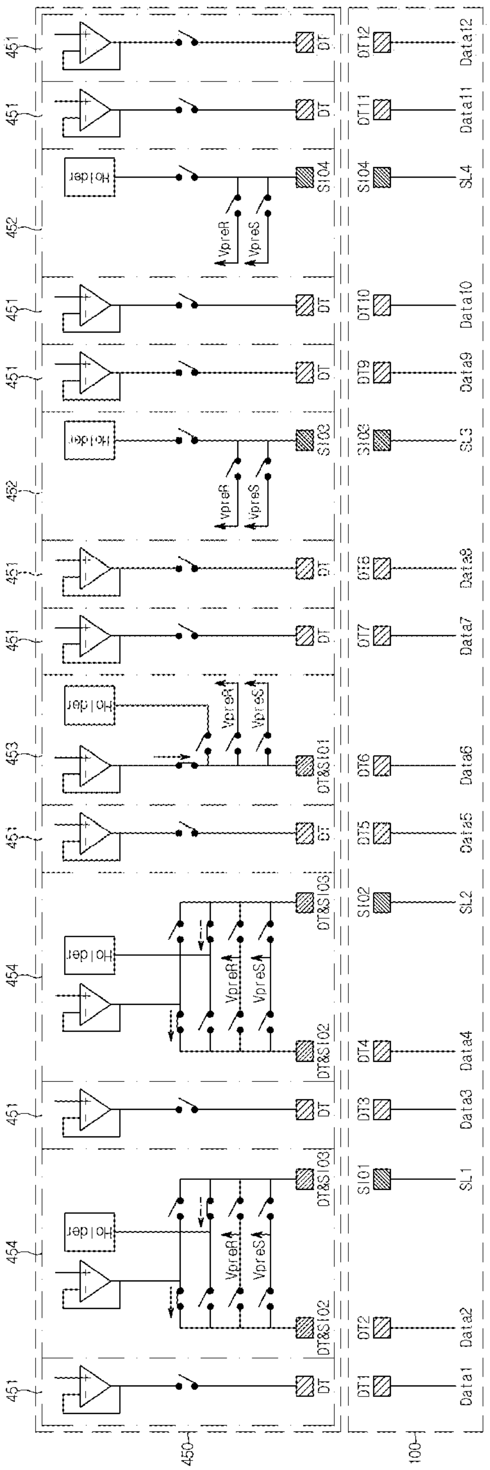
FIG. 15 is a circuit diagram showing that a buffer unit of a 3:1 sensing and 2:1 sensing common circuit is used as a 3:1 sensing circuit according to a second embodiment of the present disclosure.

FIG. 15 is a circuit diagram showing that a buffer unit of a 3:1 sensing and 2:1 sensing common circuit is used as a 3:1 sensing circuit according to a second embodiment of the present disclosure.

Referring to FIGS. 1, 8, and 15, the buffer unit 450 of the data driver 400 constituting the 3:1 sensing and 2:1 sensing common circuit may include the first output part 451, the fourth output part 454, the first output part 451, the fourth output part 454, the first output part 451, the third output part 453, the first output part 451, and the first output part 451 that are disposed consecutively, and the corresponding display panel 100 may include the first data input pad DT1, the second data input pad DT2, the first sensing output pad SIO1, the third data input pad DT3, the fourth data input pad DT4, the second sensing output pad SIO2, the fifth data input pad DT5, the sixth data input pad DT6, and the third sensing output pad SIO3 that are disposed consecutively.

Referring to FIG. 15, the data pad DT of the first output part 451 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The second input/output pad DT & SIO2 of the fourth output part 454 located at the second location of the buffer unit 450 may be electrically connected to the second data input pad DT2 located at the second location of the display panel 100. The buffer BUF may receive the data voltage from the switch array 432 of the conversion unit 430 and output the data voltage to the data pad DT. The second data input pad DT2 may receive the data voltage from the data pad DT and output the data voltage to the second data line Data 2.

The third input/output pad DT & SIO3 of the fourth output part 454 located at the second location of the buffer unit 450 may be electrically connected to the first data input pad SIO1 located at the third location of the display panel 100. The first sensing output pad SIO1 may receive the sensing voltage from the first sensing line SL 1 and output the sensing voltage to the third input/output pad DT & SIO3. The third input/output pad DT & SIO3 may be electrically connected to the holder Holder to transmit the sensing voltage to the current input device 462 inside the sensing circuit 460.

The data pad DT of the first output part 451 located at the third location of the buffer unit 450 may be electrically connected to the third data input pad DT3 located at the fourth location of the display panel 100. The buffer BUF may receive the data voltage from the switch array 432 of the conversion unit 430 and output the data voltage to the data pad DT. The third data input pad DT3 may receive the data voltage from the data pad DT and output the data voltage to the third data line Data 3.

The second input/output pad DT & SIO2 of the fourth output part 454 located at the fourth location of the buffer unit 450 may be electrically connected to the fourth data input pad DT4 located at the fifth location of the display panel 100. The buffer BUF may receive the data voltage from the switch array 432 of the conversion unit 430 and output the data voltage to the data pad DT. The fourth data input pad DT4 may receive a data voltage from the data pad DT and output the data voltage to a fourth data line Data 4.

The third input/output pad DT & SIO3 of the fourth output part 454 located at the second location of the buffer unit 450 may be electrically connected to the second data input pad SIO2 located at the sixth location of the display panel 100. The second sensing output pad SIO2 may receive the sensing voltage from the second sensing line SL 2 and output the sensing voltage to the third input/output pad DT & SIO3. The third input/output pad DT & SIO3 may be electrically the sensing circuit 460.

The data pad DT of the first output part 451 located at the fifth location of the buffer unit 450 may be electrically connected to the fifth data input pad DT5 located at the seventh location of the display panel 100. The buffer BUF may receive the data voltage from the switch array 432 of the conversion unit 430 and output the data voltage to the data pad DT. The fifth data input pad DT5 may receive the data voltage from the data pad DT and output the data voltage to the fifth data line Data 5.

The first input/output pad DT & SIO1 of the third output part 453 located at the sixth location of the buffer unit 450 may be electrically connected to the sixth data input pad DT6 located at an eighth location of the display panel 100. The buffer BUF may receive the data voltage from the switch array 432 of the conversion unit 430 and output the data voltage to the data pad DT. The sixth data input pad DT6 may receive the data voltage from the data pad DT and output the data voltage to the sixth data line Data 6.

Figure 16:
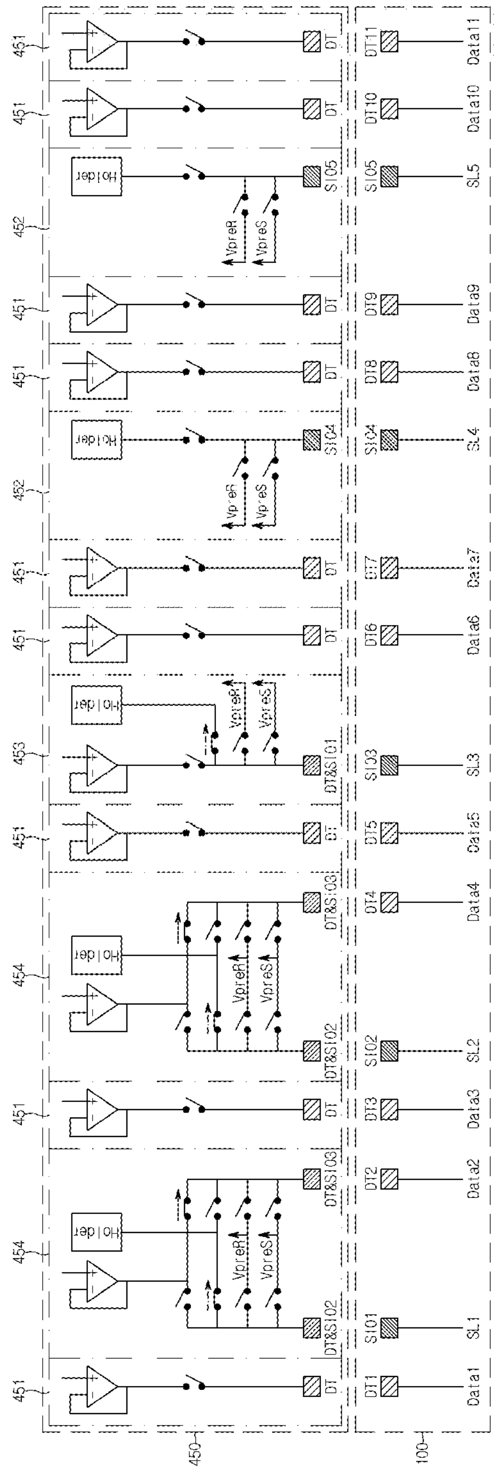
FIG. 16 is a circuit diagram showing that buffer unit of the 3:1 sensing and 2:1 sensing common circuit is used as a 2:1 sensing circuit according to the second embodiment of the present disclosure.

FIG. 16 is a circuit diagram showing that buffer unit of the 3:1 sensing and 2:1 sensing common circuit is used as a 2:1 sensing circuit according to the second embodiment of the present disclosure.

Referring to FIGS. 1, 8, and 16, the buffer unit 450 of the data driver 400 constituting the 3:1 sensing and 2:1 sensing common circuit may include the first output part 451, the fourth output part 454, the first output part 451, the fourth output part 454, the first output part 451, the third output part 453, the first output part 451, and the first output part 451 that are disposed consecutively, and the corresponding display panel 100 may include the first data input pad DT1, the first sensing output pad SIO1, the second data input pad DT2, the third data input pad DT3, the second sensing output pad SIO2, the fourth data input pad DT4, the fifth data input pad DT5, the third sensing output pad SIO3, the sixth data input pad DT6, the seventh data input pad DT7, and the fourth sensing output pad SIO4 that are disposed consecutively.

Referring to FIG. 16, the data pad DT of the first output part 451 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The second input/output pad DT & SIO2 of the fourth output part 454 located at the second location of the buffer unit 450 may be electrically connected to the first sensing output pad SIO1 located at the second location of the display panel 100. The first sensing output pad SIO1 may receive the sensing voltage from the first sensing line SL 1 and output the sensing voltage to the third input/output pad DT & SIO3. The third input/output pad DT & SIO3 may be electrically connected to the holder Holder to transmit the sensing voltage to the current input device 462 inside the sensing circuit 460.

The third input/output pad DT & SIO3 of the fourth output part 454 located at the second location of the buffer unit 450 may be electrically connected to the second data input pad DT2 located at the third location of the display panel 100. The buffer BUF may receive the data voltage from the switch array 432 of the conversion unit 430 and output the data voltage to the data pad DT. The second data input pad DT2 may receive the data voltage from the data pad DT and output the data voltage to the second data line Data 2.

The data pad DT of the first output part 451 located at the third location of the buffer unit 450 may be electrically connected to the third data input pad DT3 located at the fourth location of the display panel 100. The buffer BUF may receive the data voltage from the switch array 432 of the conversion unit 430 and output the data voltage to the data pad DT. The third data input pad DT3 may receive the data voltage from the data pad DT and output the data voltage to the third data line Data 3.

The second input/output pad DT & SIO2 of the fourth output part 454 located at the fourth location of the buffer unit 450 may be electrically connected to the second sensing output pad SIO2 located at the fifth location of the display panel 100. The second sensing output pad SIO2 may receive the sensing voltage from the second sensing line SL 2 and output the sensing voltage to the third input/output pad DT & SIO3. The third input/output pad DT & SIO3 may be electrically connected to the holder Holder to transmit the sensing voltage to the current input device 462 inside the sensing circuit 460.

The third input/output pad DT & SIO3 of the fourth output part 454 located at the fourth location of the buffer unit 450 may be electrically connected to the fourth data input pad DT4 located at the sixth location of the display panel 100. The buffer BUF may receive the data voltage from the switch array 432 of the conversion unit 430 and output the data voltage to the data pad DT. The fourth data input pad DT4 may receive a data voltage from the data pad DT and output the data voltage to a fourth data line Data 4.

The data pad DT of the first output part 451 located at the sixth location of the buffer unit 450 may be electrically connected to the fifth data input pad DT5 located at the seventh location of the display panel 100. The buffer BUF may receive the data voltage from the switch array 432 of the conversion unit 430 and output the data voltage to the data pad DT. The fifth data input pad DT5 may receive the data voltage from the data pad DT and output the data voltage to the fifth data line Data 5.

The first input/output pad DT & SIO1 of the third output part 453 located at the sixth location of the buffer unit 450 may be electrically connected to the third sensing output pad SIO3 located at the eighth location of the display panel 100. The third sensing output pad SIO3 may receive the sensing voltage from the third sensing line SL 3 and output the sensing voltage to the first input/output pad DT & SIO1. The first input/output pad DT & SIO1 may be electrically connected to the holder Holder to transmit the sensing voltage to the current input device 462 inside the sensing circuit 460.

Referring to FIGS. 15 and 16, by consecutively arranging the first output part 451, the fourth output part 454, the first output part 451, the fourth output part 454, the first output part 451, the third output part 453, the first output part 451, and the first output part 451 in the buffer unit 450 of the data driver 400, it is possible to reduce the cost using the data driver 400 commonly for the 3:1 sensing and 2:1 sensing without additionally changing hardware.

Figure 17:
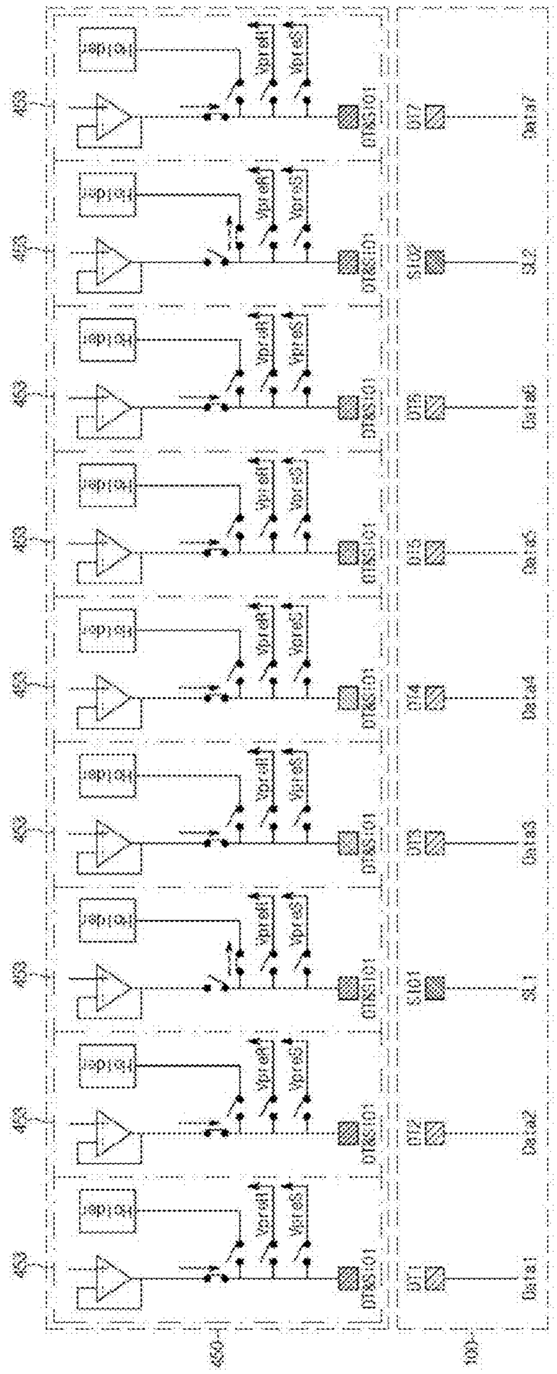
FIG. 17 is a circuit diagram showing that a buffer unit of a 4:1 sensing, 3:1 sensing, and 2:1 sensing common circuit is used as a 4:1 sensing circuit according to a third embodiment of the present disclosure.

FIG. 17 is a circuit diagram showing that a buffer unit of a 4:1 sensing, 3:1 sensing, and 2:1 sensing common circuit is used as a 4:1 sensing circuit according to a third embodiment of the present disclosure.

Referring to FIGS. 1, 8, and 17, the buffer unit 450 of the data driver 400 constituting the 4:1 sensing, 3:1 sensing, and 2:1 sensing common circuit may include the third output parts 453 that are disposed consecutively, and the corresponding display panel 100 may include the first data input pad DT1, the second data input pad DT2, the first sensing output pad SIO1, the third data input pad DT3, and the fourth data pad DT4 that are disposed consecutively.

The first input/output pad DT & SIO1 of the third output part 453 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The first input/output pad DT & SIO1 of the third output part 453 located at the second location of the buffer unit 450 may be electrically connected to the second data input pad DT2 located at the second location of the display panel 100. The buffer BUF may receive the data voltage from the switch array 432 of the conversion unit 430 and output the data voltage to the data pad DT. The second data input pad DT2 may receive the data voltage from the data pad DT and output the data voltage to the second data line Data 2.

The first input/output pad DT & SIO1 of the third output part 453 located at the third location of the buffer unit 450 may be electrically connected to the first sensing output pad SIO1 located at the third location of the display panel 100. The first sensing output pad SIO1 may receive the sensing voltage from the first sensing line SL 1 and output the sensing voltage to the first input/output pad DT & SIO1. The first input/output pad DT & SIO1 may be electrically connected to the holder Holder to transmit the sensing voltage to the current input device 462 inside the sensing circuit 460.

The first input/output pad DT & SIO1 of the third output part 453 located at the fourth location of the buffer unit 450 may be electrically connected to the third data input pad DT3 located at the fourth location of the display panel 100. The buffer BUF may receive the data voltage from the switch array 432 of the conversion unit 430 and output the data voltage to the data pad DT. The third data input pad DT3 may receive the data voltage from the data pad DT and output the data voltage to the third data line Data 3.

The first input/output pad DT & SIO1 of the third output part 453 located at the fifth location of the buffer unit 450 may be electrically connected to the fourth data input pad DT4 located at the fifth location of the display panel 100. The buffer BUF may receive the data voltage from the switch array 432 of the conversion unit 430 and output the data voltage to the data pad DT. The fourth data input pad DT4 may receive a data voltage from the data pad DT and output the data voltage to a fourth data line Data 4.

Figure 18:
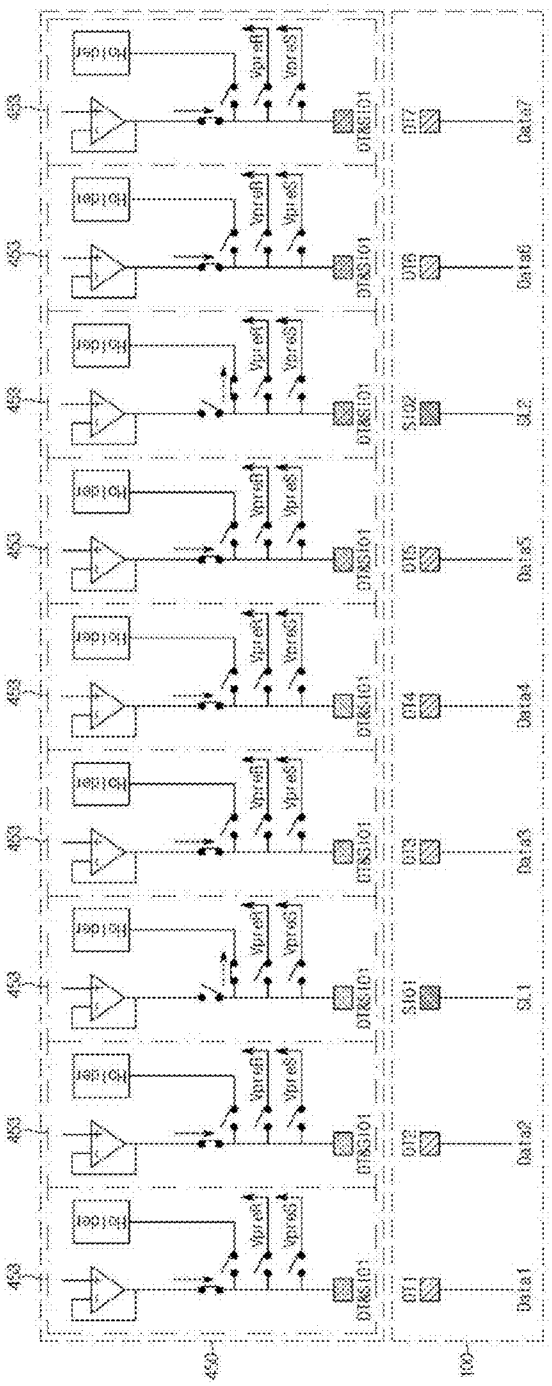
FIG. 18 is a circuit diagram showing that the buffer unit of the 4:1 sensing, 3:1 sensing, and 2:1 sensing common circuit is used as a 3:1 sensing circuit according to the third embodiment of the present disclosure.

FIG. 18 is a circuit diagram showing that the buffer unit of the 4:1 sensing, 3:1 sensing, and 2:1 sensing common circuit is used as a 3:1 sensing circuit according to the third embodiment of the present disclosure.

Referring to FIGS. 1, 8, and 18, the buffer unit 450 of the data driver 400 constituting the 4:1 sensing, 3:1 sensing, and 2:1 sensing common circuit may include the third output parts 453 that are disposed consecutively, and the corresponding display panel 100 may include the first data input pad DT1, the second data input pad DT2, the first sensing output pad SIO1, and the third data input pad DT3 that are disposed consecutively.

The first input/output pad DT & SIO1 of the third output part 453 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The first input/output pad DT & SIO1 of the third output part 453 located at the second location of the buffer unit 450 may be electrically connected to the second data input pad DT2 located at the second location of the display panel 100. The buffer BUF may receive the data voltage from the switch array 432 of the conversion unit 430 and output the data voltage to the data pad DT. The second data input pad DT2 may receive the data voltage from the data pad DT and output the data voltage to the second data line Data 2.

The first input/output pad DT & SIO1 of the third output part 453 located at the third location of the buffer unit 450 may be electrically connected to the first sensing output pad SIO1 located at the third location of the display panel 100. The first sensing output pad SIO1 may receive the sensing voltage from the first sensing line SL 1 and output the sensing voltage to the first input/output pad DT & SIO1. The first input/output pad DT & SIO1 may be electrically connected to the holder Holder to transmit the sensing voltage to the current input device 462 inside the sensing circuit 460.

The first input/output pad DT & SIO1 of the third output part 453 located at the fourth location of the buffer unit 450 may be electrically connected to the third data input pad DT3 located at the fourth location of the display panel 100. The buffer BUF may receive the data voltage from the switch array 432 of the conversion unit 430 and output the data voltage to the data pad DT. The third data input pad DT3 may receive the data voltage from the data pad DT and output the data voltage to the third data line Data 3.

Figure 19:
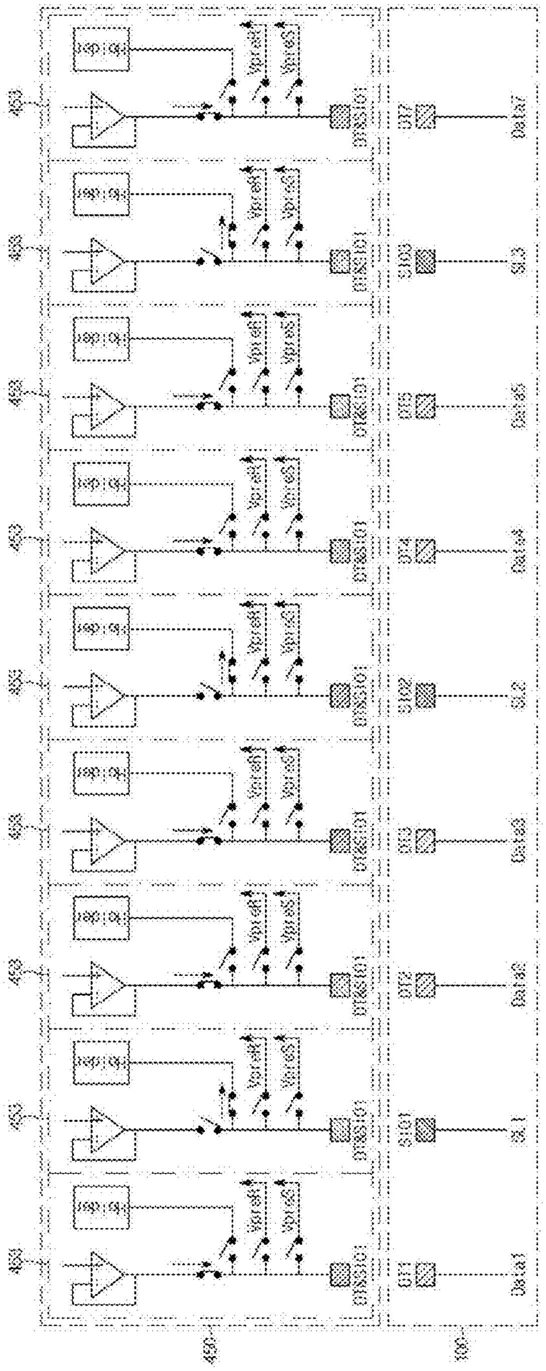
FIG. 19 is a circuit diagram showing that the buffer unit of the 4:1 sensing, 3:1 sensing, and 2:1 sensing common circuit is used as a 2:1 sensing circuit according to the third embodiment of the present disclosure.

FIG. 19 is a circuit diagram showing output parts of the 2:1 sensing circuit in the output parts of the 4:1 sensing, 3:1 sensing, and 2:1 sensing common circuit according to the third embodiment of the present disclosure.

Referring to FIGS. 1, 8, and 19, the buffer unit 450 of the data driver 400 constituting the 4:1 sensing, 3:1 sensing, and 2:1 sensing common circuit may include the third output parts 453 that are disposed consecutively, and the corresponding display panel 100 may include the first data input pad DT1, the first sensing output pad SIO1, and the second data input pad DT2 that are disposed consecutively.

The first input/output pad DT & SIO1 of the third output part 453 located at the first location of the buffer unit 450 may be electrically connected to the first data input pad DT1 located at the first location of the display panel 100. The buffer BUF may receive the data voltage from the switch array 432 of the conversion unit 430 and output the data voltage to the data pad DT. The first data input pad DT1 may receive the data voltage from the data pad DT and output the data voltage to the first data line Data 1.

The first input/output pad DT & SIO1 of the third output part 453 located at the second location of the buffer unit 450 may be electrically connected to the first sensing output pad SIO1 located at the second location of the display panel 100. The first sensing output pad SIO1 may receive the sensing voltage from the first sensing line SL 1 and output the sensing voltage to the first input/output pad DT & SIO1. The first input/output pad DT & SIO1 may be electrically connected to the holder Holder to transmit the sensing voltage to the current input device 462 inside the sensing circuit 460.

The first input/output pad DT & SIO1 of the third output part 453 located at the third location of the buffer unit 450 may be electrically connected to the second data input pad DT2 located at the third location of the display panel 100. The buffer BUF may receive the data voltage from the switch array 432 of the conversion unit 430 and output the data voltage to the data pad DT. The second data input pad DT2 may receive the data voltage from the data pad DT and output the data voltage to the second data line Data 2.

Referring to FIGS. 17, 18, and 19, by consecutively arranging the third output parts 453 in the buffer unit 450 of the data driver 400, it is possible to reduce the cost using the data driver 400 commonly for the 4:1 sensing, 3:1 sensing, and 2:1 sensing without additionally changing hardware.

According to the display device according to the embodiments, the cost can be reduced commonly using the output parts of the data driver.

The above description and the accompanying drawings are merely illustrative of the technical spirit of the present disclosure, and those skilled in the art to which the present disclosure pertains can perform various changes or modifications, such as coupling, separation, substitution, and change of components, without departing from the essential characteristics of the present disclosure. Therefore, the embodiments disclosed in the present disclosure are not intended to limit the technical spirit of the present disclosure, but for describing it, and the scope of the technical spirit of the present disclosure is not limited by these embodiments. The scope of the present disclosure includes those of the appended claims, and all technical spirits within the equivalent range should be construed as being included in the scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a display panel including a plurality of pads; and
a data driver including a plurality of pads,
wherein the data driver includes a first output part including a buffer, a holder, and a first input or output pad, and
a first data switch is disposed between the buffer and the first input/output pad.

2. The display device of claim 1, wherein the first output part further includes a first sensing switch, a first voltage switch, and a second voltage switch.

3. The display device of claim 2, wherein the first data switch has one end connected to the buffer and another end connected to the first input or output pad,
the first sensing switch has one end connected to the holder and another end connected to the first input or output pad,
the first voltage switch has one end connected to a first initialization voltage and another end connected to the first input or output pad, and
the second voltage switch has one end connected to a second initialization voltage and another end connected to the first input or output pad.

4. The display device of claim 1, wherein the data driver further includes:
a second output part including a buffer and a data pad;
a third output part including a holder and a sensing pad; and
a fourth output part including a buffer, a holder, a second input or output pad, and a third input or output pad.

5. The display device of claim 4, wherein the second output part further includes a second data switch, and
the second data switch has one end connected to the buffer and the other end connected to the data pad of the second output part.

6. The display device of claim 4, wherein the third output part further includes a first sensing switch, a first voltage switch, and a second voltage switch,
the first sensing switch has one end connected to the holder and another end connected to the sensing pad,
the first voltage switch has one end connected to a first initialization voltage and another end connected to the sensing pad, and
the second voltage switch has one end connected to a second initialization voltage and another end connected to the sensing pad.

7. The display device of claim 4, wherein the fourth output part further includes a first data switch, a second data switch, a first sensing switch, a second sensing switch,
a first voltage switch, a second voltage switch, a third voltage switch, and a fourth voltage switch,
the first data switch has one end connected to the buffer and another end connected to the second input or output pad,
the second data switch has one end connected to the buffer and another end connected to the third input or output pad,
the first sensing switch has one end connected to the holder and another end connected to the second input or output pad,
the second sensing switch has one end connected to the holder and another end connected to the third input or output pad,
the first voltage switch has one end connected to a first initialization voltage and another end connected to the second input or output pad,
the second voltage switch has one end connected to the first initialization voltage and another end connected to the third input or output pad,
the third voltage switch has one end connected to a second initialization voltage and another end connected to the second input or output pad, and
the fourth voltage switch has one end connected to the second initialization voltage and another end connected to the third input or output pad.

8. The display device of claim 1, wherein the data driver includes:
a second output part including a buffer and a data pad;
a third output part including a holder and a sensing pad; and
a fourth output part including a buffer, a holder, and a first input or output pad.

9. The display device of claim 8, wherein the second output part further includes a data switch, and
the data switch of the second output part has one end connected to the buffer and another end connected to the data pad of the second output part.

10. The display device of claim 8, wherein the third output part further includes a first sensing switch, a first voltage switch, and a second voltage switch, the first sensing switch of the third output part has one end connected to the holder and another end connected to the sensing pad of the third output part, the first voltage switch of the third output part has one end connected to a first initialization voltage and another end connected to the sensing pad of the third output part, and the second voltage switch of the third output part has one end connected to a second initialization voltage and another end connected to the sensing pad of the third output part.

11. The display device of claim 8, wherein the fourth output part further includes a first data switch, a first sensing switch, a first voltage switch, and a second voltage switch, the first data switch of the fourth output part has one end connected to the buffer and another end connected to the first input or output pad of the fourth output part, the first sensing switch of the fourth output part has one end connected to the holder and another end connected to the first input or output pad of the fourth output part, the first voltage switch of the fourth output part has one end connected to a first initialization voltage and another end connected to the first input or output pad of the fourth output part, and the second voltage switch of the fourth output part has one end connected to a second initialization voltage and another end connected to the first input or output pad of the fourth output part.

12. A display device, comprising:

a display panel including a plurality of pads; and a data driver including a plurality of pads, wherein the data driver includes a first output part including a buffer, a holder, a first input or output pad, and a second input or output pad, a first data switch is disposed between the buffer and the second input or output pad, a first sensing switch is disposed between the holder and the first input or output pad, a second data switch is disposed between the buffer and the second input or output pad, and a second sensing switch is disposed between the holder and the second input or output pad.

13. The display device of claim 12, wherein the first output part further includes a first voltage switch, a second voltage switch, a third voltage switch, and a fourth voltage switch.

14. The display device of claim 13, wherein the first data switch has one end connected to the buffer and another end connected to the first input or output pad, the second data switch has one end connected to the buffer and another end connected to the second input or output pad, the first sensing switch has one end connected to the holder and another end connected to the first input or output pad, the second sensing switch has one end connected to the holder and another end connected to the second input or output pad, the first voltage switch has one end connected to a first initialization voltage and another end connected to the first input or output pad, the second voltage switch has one end connected to the first initialization voltage and another end connected to the second input/output pad, the third voltage switch has one end connected to a second initialization voltage and another end connected to the first input or output pad, and the fourth voltage switch has one end connected to the second initialization voltage and another end connected to the second input or output pad.

15. A display device, comprising:

a display panel including a plurality of first pads, the plurality of first pads including a sensing output pad and a data input pad; and a data driver including a plurality of output parts, a first output part of the plurality output part including:

a first input or output pad, a first buffer coupled to the first input or output pad through a first data switch; and a holder coupled to the first input or output pad through a first sensing switch.

16. The display device of claim 15, wherein the first input or output pad is coupled to a sensing output pad of the display panel.

17. The display device of claim 15, wherein the first input or output pad is coupled to a data input pad of the display panel.

18. The display device of claim 15, wherein the first output part includes:

a second input or output pad, a second data switch coupled between the first buffer and the second input or output pad; and a second sensing switch coupled between the holder and the second input or output pad.

19. The display device of claim 18, wherein the first input or output pad is coupled to a sensing output pad of the display panel and the second input or output pad is coupled to a data input pad of the display panel.

20. The display device of claim 15, wherein the first output part includes:

a first voltage switch coupled between a first initialization voltage and the first input or output pad, a second voltage switch coupled between a second initialization voltage and the first input or output pad.

* * * * *